(12) United States Patent
Totsuka

(10) Patent No.: US 12,717,220 B2
(45) **Date of Patent: *Aug. 25, 2026**

(54) POSITION ADJUSTMENT APPARATUS AND PROJECTION SYSTEM

(71) Applicant: SEIKO EPSON CORPORATION, Tokyo (JP)

(72) Inventor: Takahiro Totsuka, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 274 days.

This patent is subject to a terminal disclaimer.

(21) Appl. No.: 18/616,591

(22) Filed: Mar. 26, 2024

(65) Prior Publication Data

US 2024/0329504 A1 Oct. 3, 2024

(30) Foreign Application Priority Data

Mar. 27, 2023 (JP) ................................ 2023-049539

(51) Int. Cl.
*G03B 21/14* (2006.01)

(52) U.S. Cl.
CPC ................................. *G03B 21/145* (2013.01)

(58) Field of Classification Search
CPC ..... G03B 21/145; G03B 21/16; G03B 21/142
See application file for complete search history.

(56) References Cited

U.S. PATENT DOCUMENTS

| | | | | |
|---|---|---|---|---|
| 2002/0001067 A1* | 1/2002 | Tachibana | G03B 21/10 | 353/101 |
| 2009/0015803 A1* | 1/2009 | Kimura | G03B 21/14 | 720/695 |
| 2010/0118275 A1* | 5/2010 | Murakami | G03B 21/16 | 353/30 |
| 2010/0128228 A1* | 5/2010 | Matsuo | G03B 37/04 | 353/30 |

(Continued)

FOREIGN PATENT DOCUMENTS

| | | | |
|---|---|---|---|
| CN | 113985692 A * | 1/2022 | G03B 21/54 |
| JP | H05-167950 A | 7/1993 | |

(Continued)

OTHER PUBLICATIONS

English Translation CN 113985692 (Year: 2022).*
English Translation JP 2011203286 (Year: 2011).*

*Primary Examiner* — John R Schnurr
(74) *Attorney, Agent, or Firm* — Dority and Manning, P.A.

(57) ABSTRACT

A position adjustment apparatus includes a housing, a first rotary table on which a first projector is placed and which is rotatably supported by the housing about a first rotation axis, and a second rotary table on which a second projector is placed and which is rotatably supported by the housing about a second rotation axis. The housing includes a first opening through which first image light projected from the first projector passes and a second opening through which second image light projected from the second projector passes. A rotation direction of the first rotary table and a (Continued)

rotation direction of the second rotary table are opposite to each other. Rotation of the first rotary table and rotation of the second rotary table are in conjunction with each other. The first rotary table and the second rotary table are configured to be replaceable with respect to the housing.

12 Claims, 15 Drawing Sheets

(56) References Cited

U.S. PATENT DOCUMENTS

| | | | | |
|---|---|---|---|---|
| 2012/0193499 | A1 | 8/2012 | Lin et al. | |
| 2016/0116829 | A1 | 4/2016 | Itou et al. | |
| 2024/0329503 | A1 * | 10/2024 | Totsuka | G03B 21/145 |
| 2024/0329504 | A1 | 10/2024 | Totsuka | |

FOREIGN PATENT DOCUMENTS

| | | | |
|---|---|---|---|
| JP | H09-265132 | A | 10/1997 |
| JP | 2000-137288 | A | 5/2000 |
| JP | 2004-177699 | A | 6/2004 |
| JP | 2005-128072 | A | 5/2005 |
| JP | 2011203286 | A * | 10/2011 |
| JP | 2014-006539 | A | 1/2014 |
| JP | 2015-179232 | A | 10/2015 |
| WO | WO 2014/203387 | A | 12/2014 |

* cited by examiner

POSITION ADJUSTMENT APPARATUS AND PROJECTION SYSTEM

The present application is based on, and claims priority from JP Application Serial Number 2023-049539, filed on Mar. 27, 2023, the disclosure of which is hereby incorporated by reference herein in its entirety.

BACKGROUND

1. Technical Field

The present disclosure relates to a position adjustment apparatus and a projection system.

2. Related Art

In related art, there is known a liquid crystal display multi-projection apparatus including a casing, a transmissive projection screen provided at a front surface of the casing, and a plurality of image projection units (see, for example, JP-A-9-265132).

The liquid crystal display multi-projection apparatus disclosed in JP-A-9-265132 includes the plurality of image projection units integrally equipped with image projection lens units. Each image projection unit includes an attitude control mechanism, and the attitude control mechanism includes a two-axis attitude control mechanism and a four-axis attitude control mechanism.

The two-axis attitude control mechanism aligns the image projection lens units in an upper-lower direction and a left-right direction. The four-axis attitude control mechanism not only changes a size of an image projected on the projection screen according to a user operation on a Z-axis adjustment knob, but also changes a left-right size and an upper-lower size of the projected image according to a user operation on another adjustment knob.

By operating the image projection lens unit of each image projection unit to adjust a position and a size of the image projected on the projection screen, an image projected from each image projection unit is displayed on the projection screen.

JP-A-9-265132 is an example of the related art.

SUMMARY

However, in the liquid crystal display multi-projection apparatus disclosed in JP-A-9-265132, the attitude control mechanism including the two-axis attitude control mechanism and the four-axis attitude control mechanism is provided in the image projection unit. Therefore, when an image projection unit of another model is replaced, a size of the image projection unit, a position of the image projection lens unit, a projection angle of an image by the image projection lens unit, or the like may change, and a projection image desired by a user may not be displayed on the projection screen. Therefore, a configuration enabling replacement of an image projection unit is desirable.

A position adjustment apparatus according to a first aspect of the disclosure includes: a housing including a first space in which a first projector is disposed and a second space in which a second projector is disposed; a first rotary table on which the first projector is placed and which is rotatably supported by the housing about a first rotation axis; and a second rotary table on which the second projector is placed and which is rotatably supported by the housing about a second rotation axis parallel to the first rotation axis, in which the housing includes: a first opening through which first image light projected from the first projector passes; and a second opening through which second image light projected from the second projector passes, a rotation direction of the first rotary table and a rotation direction of the second rotary table are opposite to each other, rotation of the first rotary table and rotation of the second rotary table are in conjunction with each other, and the first rotary table and the second rotary table are configured to be replaceable with respect to the housing.

A projection system according to a second aspect of the disclosure includes: a first projector configured to project first image light; a second projector configured to project second image light; and the position adjustment apparatus according to the first aspect.

BRIEF DESCRIPTION OF THE DRAWINGS

FIG. 8 is a perspective view showing a first rotary table supported by a first support portion and a second rotary table supported by a second support portion according to the embodiment.

DESCRIPTION OF EMBODIMENTS

Hereinafter, an embodiment of the disclosure will be described with reference to the drawings.

Configuration of Projection System

Figure 1:
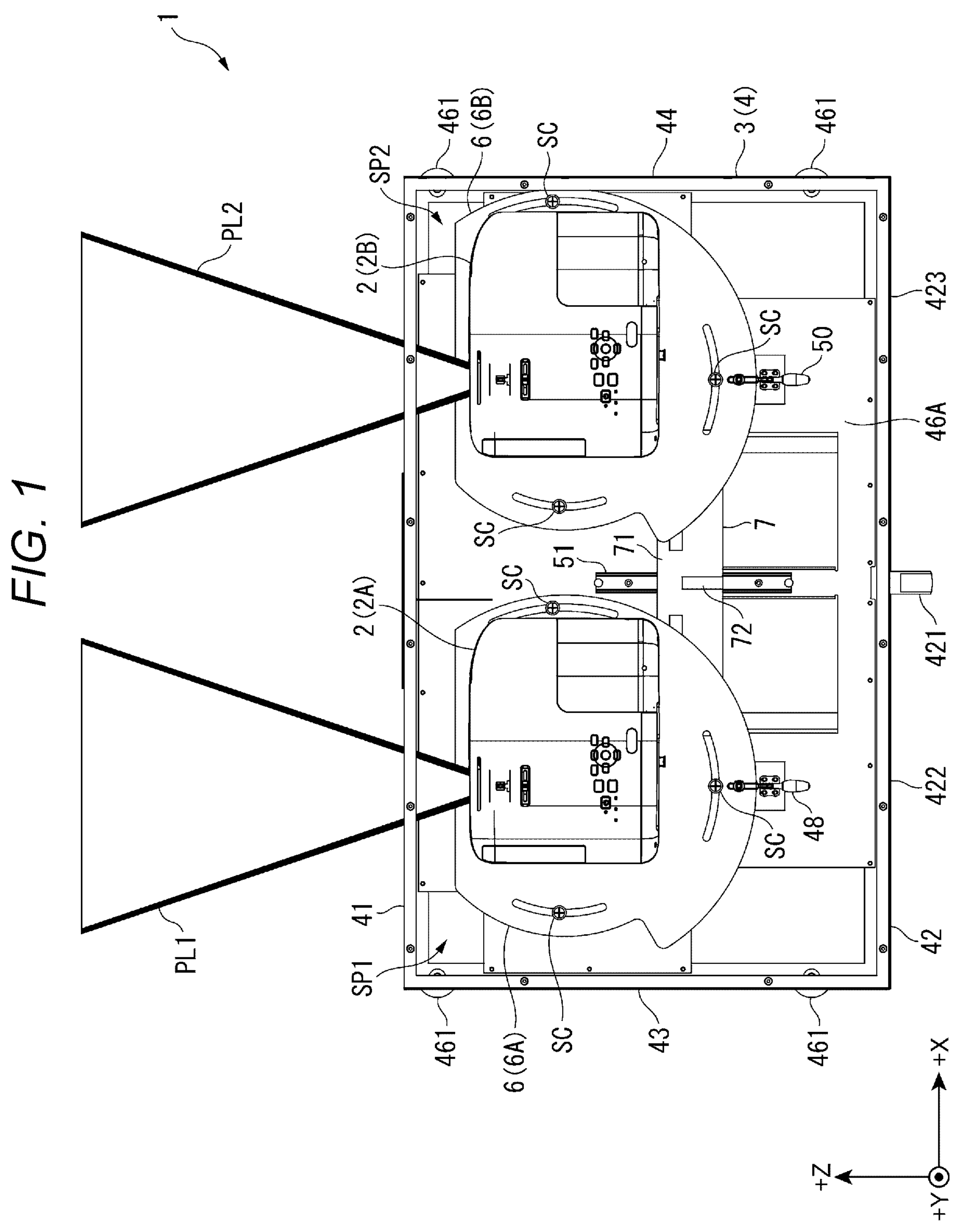
FIG. 1 is a plan view showing a projection system according to an embodiment.

FIG. 1 is a plan view showing a projection system 1 in a state in which a top plate 451 of a position adjustment apparatus 3 is removed.

As shown in FIG. 1, the projection system 1 according to the embodiment includes two projectors 2 and the position adjustment apparatus 3 that accommodates the two projectors 2. By image light projected from each projector 2 onto a projection surface such as a screen, the projection system 1 can project one continuous image onto the projection surface and can also project two images apart from each other onto the projection surface, for example.

Hereinafter, each configuration of the projection system 1 will be described.

Configuration of Projector

Figure 2:
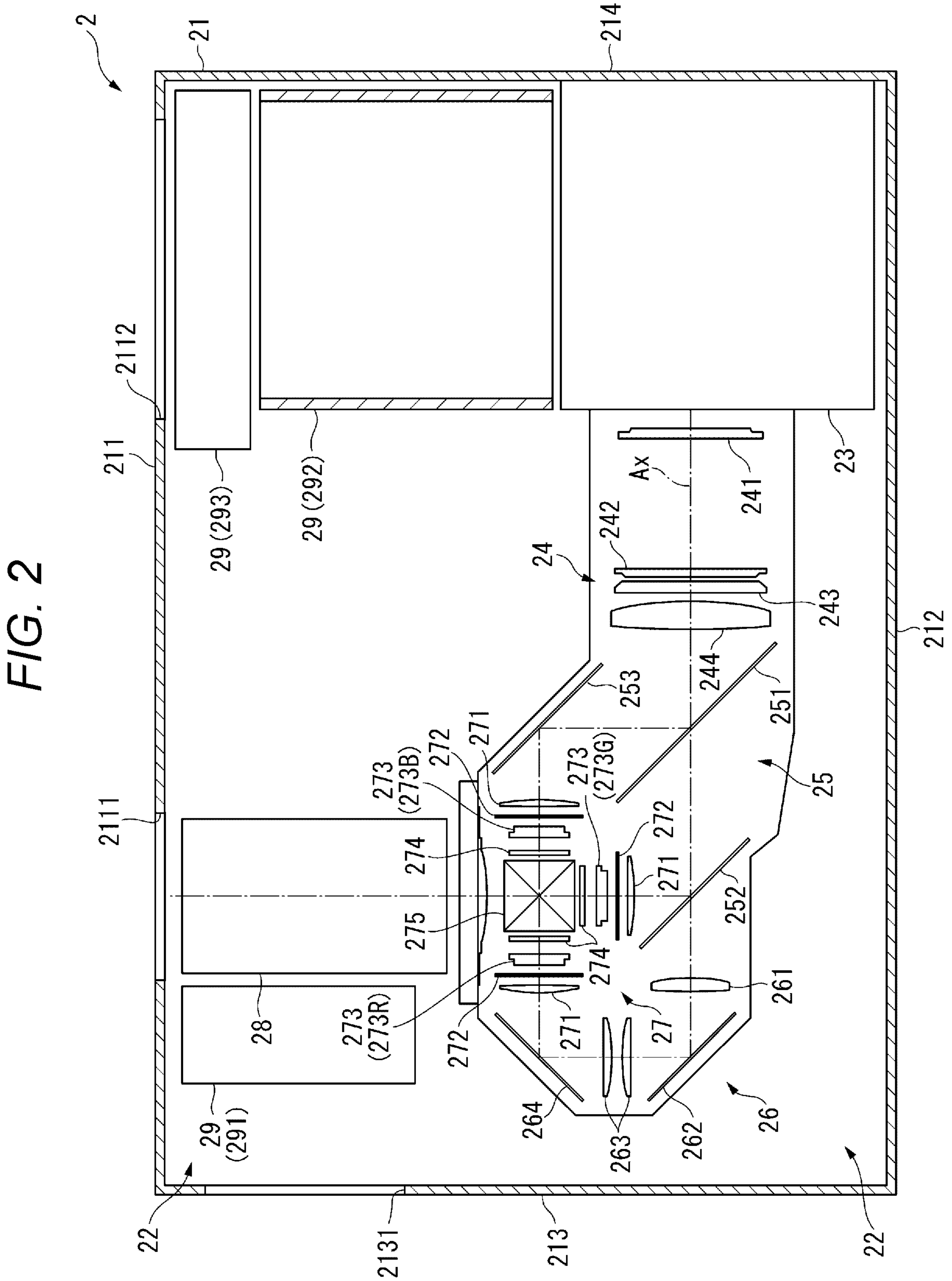
FIG. 2 is a schematic diagram showing a configuration of a projector according to the embodiment.

FIG. 2 is a schematic diagram showing a configuration of the projector 2.

As shown in FIG. 2, the projector 2 includes an external casing 21, an image projection apparatus 22, and a cooling apparatus 29. Although not shown, the projector 2 also includes a control apparatus that controls an operation of the projector 2, and a power supply apparatus that supplies electric power to electronic components constituting the projector 2.

Configuration of External Casing

The external casing 21 constitutes an outer shell of the projector 2 and accommodates the image projection apparatus 22 and the cooling apparatus 29. The external casing 21 includes a front surface 211, a rear surface 212, a right side surface 213, and a left side surface 214, in addition to a top surface and a bottom surface not shown in FIG. 2. The front surface 211 and the rear surface 212 are surfaces opposite to each other, the right side surface 213 and the left side surface 214 are surfaces opposite to each other, and the top surface and the bottom surface are surfaces opposite to each other.

The front surface 211 includes a projection port 2111 and an exhaust port 2112.

The projection port 2111 is an opening through which image light projected by the projection optical apparatus 28 of the image projection apparatus 22 passes.

The exhaust port 2112 is provided in a portion of the front surface 211 on a left side surface 214 side. The exhaust port 2112 discharges air flowing inside the external casing 21 to the outside of the external casing 21.

The right side surface 213 includes an intake port 2131. The intake port 2131 introduces air outside the external casing 21 as cooling air into the external casing 21.

Although not shown, the bottom surface is provided with a plurality of screw holes where a fixture supporting the projector 2 in a suspended state when the top surface faces downward is fixed.

Configuration of Image Projection Apparatus

The image projection apparatus 22 forms image light according to image information received from the control apparatus and projects the formed image light. The image projection apparatus 22 includes a light source apparatus 23, a uniformization optical system 24, a color separation optical system 25, a relay optical system 26, an image forming apparatus 27, and the projection optical apparatus 28, all of which are disposed on an optical axis Ax set in the image projection apparatus 22.

The light source apparatus 23 emits illumination light to the uniformization optical system 24. A configuration of the light source apparatus 23 may be, for example, a configuration including a solid-state light source that emits blue light as excitation light and a wavelength conversion element that converts at least a part of the blue light emitted from the solid-state light source into fluorescence including green light and red light. Another configuration of the light source apparatus 23 may be a configuration including a light source lamp such as an ultra-high-pressure mercury lamp or a configuration including a light emitting element that emits blue light, green light, and red light individually.

The uniformization optical system 24 uniformizes the light emitted from the light source apparatus 23. The uniformized light passes through the color separation optical system 25 and the relay optical system 26 and illuminates a modulation area of a light modulator 273 to be described later. The uniformization optical system 24 includes two lens arrays 241 and 242, a polarization conversion element 243, and a superimposing lens 244.

The color separation optical system 25 separates the light incident from the uniformization optical system 24 into red light, green light, and blue light. The color separation optical system 25 includes two dichroic mirrors 251 and 252, and a reflective mirror 253 that reflects blue light separated by the dichroic mirror 251.

The relay optical system 26 is provided on an optical path of red light, which is longer than optical paths of other color light, to reduce loss of red light. The relay optical system 26 includes an incident-side lens 261, a relay lens 263, and reflective mirrors 262 and 264. In the embodiment, red light is guided to the relay optical system 26. However, the disclosure is not limited thereto, and for example, a configuration may be adopted in which blue light is a color light having a longer optical path than other color light and blue light is guided to the relay optical system 26.

The image forming apparatus 27 modulates incident light of each color of red, green, and blue, combines modulated light of these colors, and forms image light. The image forming apparatus 27 includes three field lenses 271, three incident-side polarization plates 272, three light modulators 273, and three emission-side polarization plates 274, which are provided according to the incident color light, and one light combiner 275.

The light modulator 273 modulates light emitted from the light source apparatus 23 based on an image signal received from the control apparatus. Specifically, the light modulator 273 modulates color light incident from the incident-side polarization plate 272 according to the image signal received from the control apparatus, and emits the modulated color light. The three light modulators 273 include a light modulator 273R for red light, a light modulator 273G for green light, and a light modulator 273B for blue light. In the embodiment, each light modulator 273 is implemented by a transmissive liquid crystal panel having a light incident surface and a light emitting surface different from each other, and a liquid crystal light bulb is formed by the incident-side polarization plate 272, the light modulator 273, and the emission-side polarization plate 274.

The light combiner 275 combines light of the three colors modulated by the light modulators 273B, 273G, and 273R to form the image light. The image light formed by the light combiner 275 is incident on the projection optical apparatus 28. In the embodiment, the light combiner 275 is implemented by a cross dichroic prism having a substantially rectangular parallelepiped shape, and may also be implemented by a plurality of dichroic mirrors.

The projection optical apparatus 28 projects the image light incident from the image forming apparatus 27 onto the projection surface such as a s screen. The projection optical apparatus 28 may be, for example, a lens assembly including a plurality of lenses and a lens barrel that accommodates the plurality of lenses (not shown).

Configuration of Cooling Apparatus

The cooling apparatus 29 cools an object to be cooled of the projector 2. The cooling apparatus 29 includes an intake fan 291, a duct 292, and an exhaust fan 293.

The intake fan 291 is provided at a position facing the intake port 2131 inside the external casing 21. The intake fan 291 suctions air outside the external casing 21 through the intake port 2131 and introduces the air as cooling air into the external casing 21. The intake fan 291 sends suctioned cooling air to, for example, the light modulator 273.

The duct 292 couples the light source apparatus 23 to the exhaust fan 293. Cooling air that cools the light source apparatus 23 flows inside the duct 292.

The exhaust fan 293 is provided at a position facing the exhaust port 2112 inside the external casing 21. The exhaust fan 293 suctions cooling air flowing in the duct 292 and cooling air flowing inside the external casing 21. The exhaust fan 293 discharges, through the exhaust port 2112, the suctioned cooling air to the outside of the external casing 21, that is, the outside of the projector 2.

As shown in FIG. 1, two such projectors 2 are provided in the position adjustment apparatus 3. Among the two projectors 2, one projector 2 is a first projector 2A that is fixed to a first rotary table 6A to be described later and is disposed in a first space SP1 in the position adjustment apparatus 3. Among the two projectors 2, the other projector 2 is a second projector 2B that is fixed to a second rotary table 6B to be described later and is disposed in a second space SP2 in the position adjustment apparatus 3.

The first projector 2A projects first image light PL1, and the second projector 2B projects second image light PL2.

Configuration of Position Adjustment Apparatus

Figure 3:
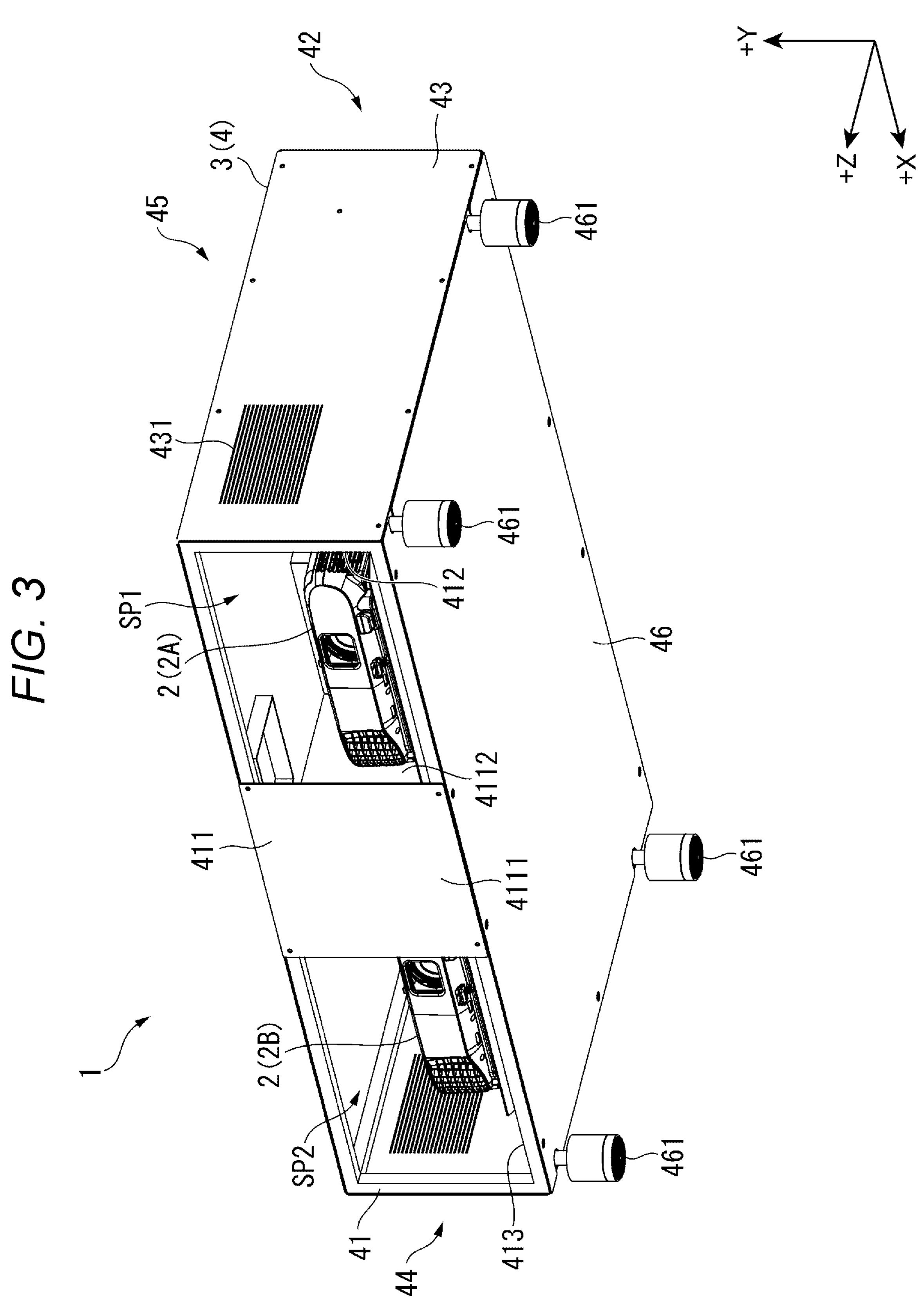
FIG. 3 is a perspective view showing the projection system according to the embodiment.
Figure 4:
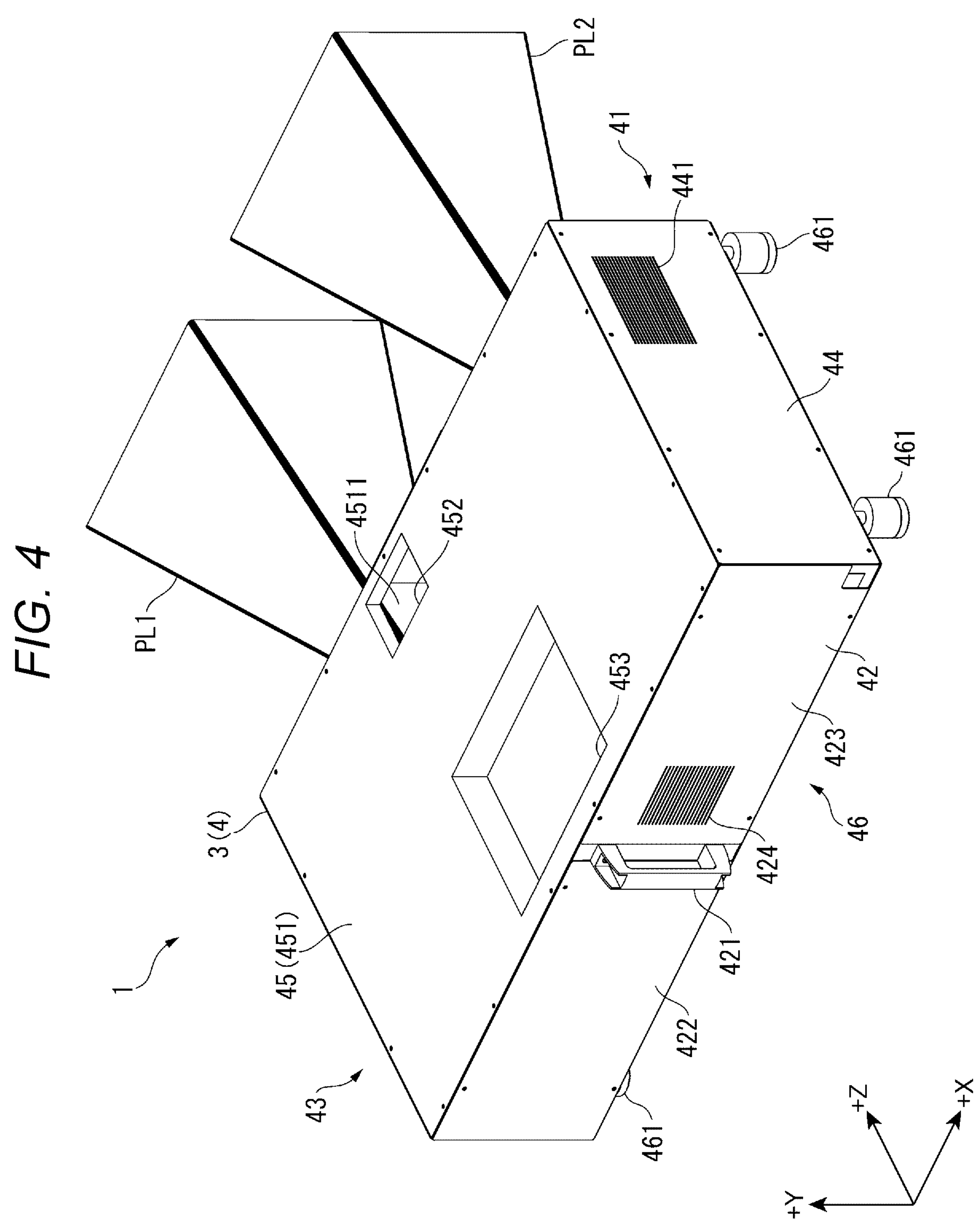
FIG. 4 is a perspective view showing the projection system according to the embodiment.

FIG. 3 is a perspective view showing the projection system 1 as viewed from a front surface side, and FIG. 4 is a perspective view showing the projection system 1 as viewed from a rear surface side.

The position adjustment apparatus 3 supports the two projectors 2. The position adjustment apparatus 3 adjusts a projection direction of the image light projected by each of the projectors 2A and 2B by adjusting an orientation of each of the projectors 2A and 2B with respect to the projection surface, and thereby adjusts a size of an image displayed on the projection surface by each image light.

The position adjustment apparatus 3 includes a housing 4 as shown in FIGS. 1, 3, and 4, and also includes two rotary tables 6 and one operation lever 7 as shown in FIG. 1. One of the two rotary tables 6 is the first rotary table 6A on which the first projector 2A is placed, and the other rotary table 6 is the second rotary table 6B on which the second projector 2B is placed.

Configuration of Housing

The housing 4 is a box-shaped casing that accommodates the two rotary tables 6 and the operation lever 7 therein. As shown in FIG. 1, the housing 4 includes a front surface 41, a rear surface 42, a right side surface 43, and a left side surface 44, also includes a top surface 45 shown in FIG. 4 and a bottom surface 46 shown in FIG. 3, and is configured in a substantially rectangular parallelepiped shape.

In the following description, three directions orthogonal to each other are referred to as a +X direction, a +Y direction, and a +Z direction. The +Z direction is a direction from the rear surface 42 toward the front surface 41, the +X direction is a direction from the right side surface 43 toward the left side surface 44, and the +Y direction is a direction from the bottom surface 46 toward the top surface 45. Although not shown, a direction opposite to the +X direction is referred to as a-X direction, a direction opposite to the +Y direction is referred to as a-Y direction, and a direction opposite to the +Z direction is referred to as a-Z direction. An axis along the +X direction is referred to as an X-axis, an axis along the +Y direction is referred to as a Y-axis, and an axis along the +Z direction is referred to as a Z-axis.

The front surface 41 and the rear surface 42 are surfaces opposite to each other on the Z-axis, the right side surface 43 and the left side surface 44 are surfaces opposite to each other on the X-axis, and the top surface 45 and the bottom surface 46 are surfaces opposite to each other on the Y-axis.

As shown in FIG. 3, the front surface 41 includes a guide wall 411, a first opening 412, and a second opening 413.

The guide wall 411 is a substantially T-shaped member provided substantially at a center of the front surface 41 on the X-axis, and a part of the guide wall 411 protrudes into the housing 4. That is, the guide wall 411 includes a flat plate portion 4111 exposed to the outside of the housing 4, and a guide portion 4112 protruding in the −Z direction, relative to a first discharge port 452 to be described later, from a surface of the flat plate portion 4111 in the −Z direction.

The guide wall 411 guides cooling air discharged from the exhaust port 2112 of the first projector 2A disposed in the first space SP1 in the housing 4 to the first discharge port 452 to be described later.

The first opening 412 is provided in the −x direction relative to the guide wall 411. The first opening 412 is an opening through which the first image light PL1 passes.

The second opening 413 is provided in the +X direction relative to the guide wall 411. The second opening 413 is an opening through which the second image light PL2 passes.

The right side surface 43 includes a first introduction port 431. The first introduction port 431 establishes communication between the first space SP1 in the housing 4 and the outside of the housing 4. The first introduction port 431 introduces air outside the housing 4 into the first space SP1.

The bottom surface 46 includes four leg portions 461. Each of the four leg portions 461 is provided at a respective corner of the rectangular bottom surface 46. Among the four leg portions 461, two leg portions 461 disposed on the front surface 41 side or two leg portions 461 disposed on the rear surface 42 side may be leg portions whose dimensions from an installation surface on which the position adjustment apparatus 3 is disposed are adjustable.

As shown in FIG. 4, the rear surface 42 includes a handle 421, a first rear surface portion 422, and a second rear surface portion 423.

The handle 421 is provided substantially at a center of the rear surface 42 on the X-axis.

The first rear surface portion 422 is disposed in the −X direction relative to the handle 421. The first rear surface portion 422 is attachable to and detachable from the housing 4, and when the first rear surface portion 422 is removed from the housing 4, the operation lever 7 to be described later is exposed to the rear surface 42 side.

The second rear surface portion 423 is disposed in the +X direction relative to the handle 421. The second rear surface portion 423 includes a second introduction port 424. That is, the housing 4 includes the second introduction port 424. The second rear surface portion 423 is also attachable to and detachable from the housing 4.

The second introduction port 424 is provided at a position on the handle 421 side at the second rear surface portion 423. The second introduction port 424 establishes communication between the second space SP2 in the housing 4 and the outside of the housing 4. The second introduction port 424 introduces air outside the housing 4 into the second space SP2.

The left side surface 44 includes a second discharge port 441. The second discharge port 441 is provided at the left side surface 44 in the +Y direction and the +Z direction. The second discharge port 441 establishes communication between the second space SP2 and the outside of the housing 4, and discharges air inside the second space SP2 to the outside of the housing 4. That is, the second discharge port 441 discharges cooling air discharged from the exhaust port 2112 of the second projector 2B arranged in the second space SP2 to the outside of the housing 4.

The top surface 45 is formed of the top plate 451 detachably attached to the housing 4. The top surface 45 includes the first discharge port 452 and a recessed portion 453 provided at the top plate 451.

The first discharge port 452 is provided at a portion of the top surface 45 in the +Z direction. Specifically, the first discharge port 452 is provided at a position on the second space SP2 side at the top surface 45 of the housing 4 covering the first space SP1 and the second space SP2. The first discharge port 452 establishes communication between the first space SP1 and the outside of the housing 4, and discharges air inside the first space SP1 to the outside of the housing 4. That is, the first discharge port 452 discharges cooling air discharged from the exhaust port 2112 of the first projector 2A disposed in the first space SP1 to the outside of the housing 4. As described above, at least a part of the cooling air discharged from the first projector 2A is guided to the first discharge port 452 by the guide wall 411.

Figure 5:
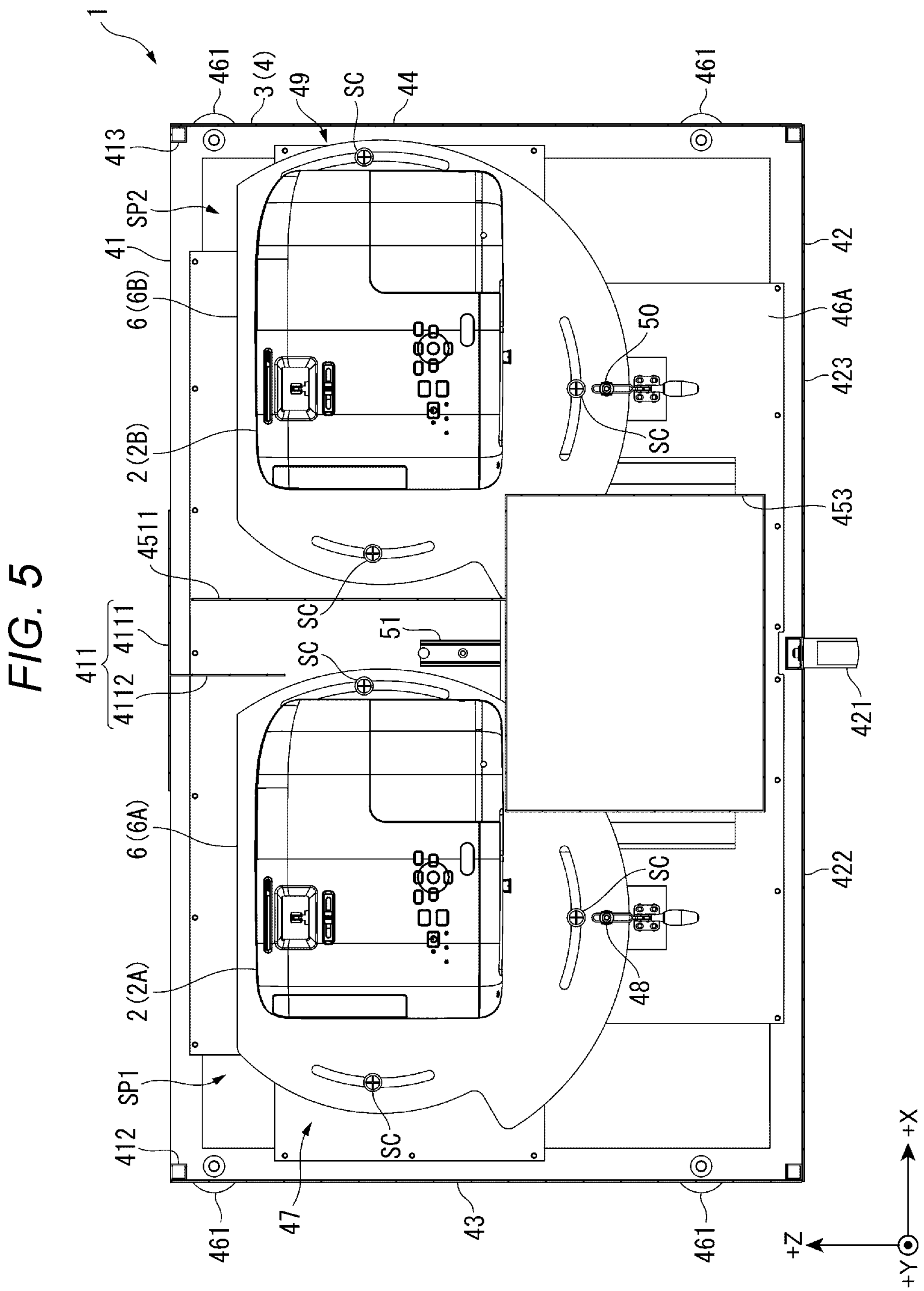
FIG. 5 shows a cross-section of a position adjustment apparatus taken along an XZ plane according to the embodiment.
Figure 6:
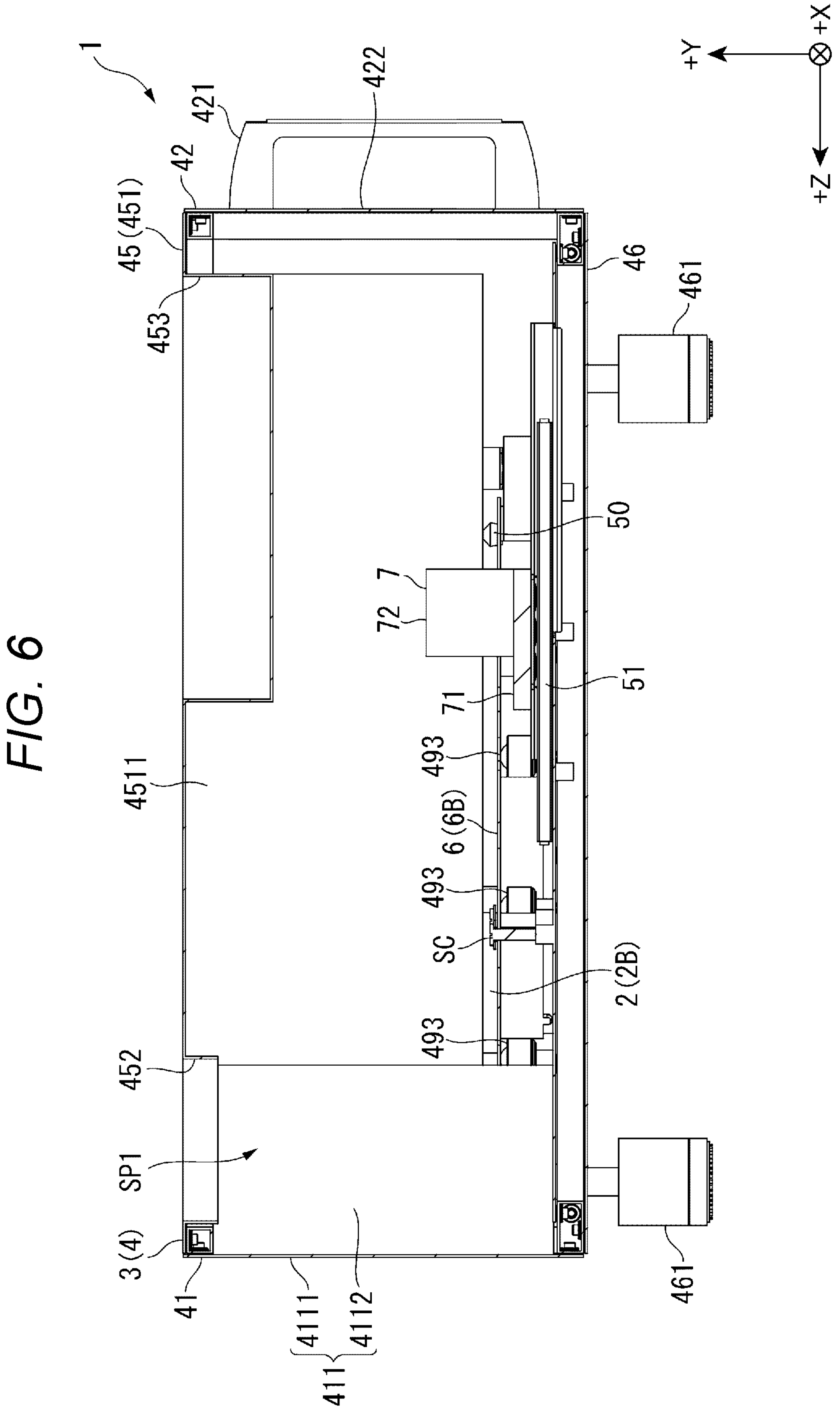
FIG. 6 is a cross-sectional view of the position adjustment apparatus taken along a YZ plane according to the embodiment.

FIG. 5 shows a cross-section of the position adjustment apparatus 3 along an XZ plane, and FIG. 6 shows a cross-section of the position adjustment apparatus 3 along a YZ plane.

As shown in FIGS. 5 and 6, the top plate 451 includes a partition wall 4511. That is, the housing 4 includes the partition wall 4511.

As shown in FIG. 5, the partition wall 4511 partitions the first space SP1 in which the first projector 2A and the first rotary table 6A are disposed and the second space SP2 in which the second projector 2B and the second rotary table 6B are disposed. As shown in FIG. 6, an end portion of the partition wall 4511 in the −Y direction is not in contact with an inner surface of the bottom surface 46. Therefore, the operation lever 7 to be described later can be disposed across the first space SP1 and the second space SP2 and is slidable along the Z-axis.

Internal Configuration of Position Adjustment Apparatus

Figure 7:
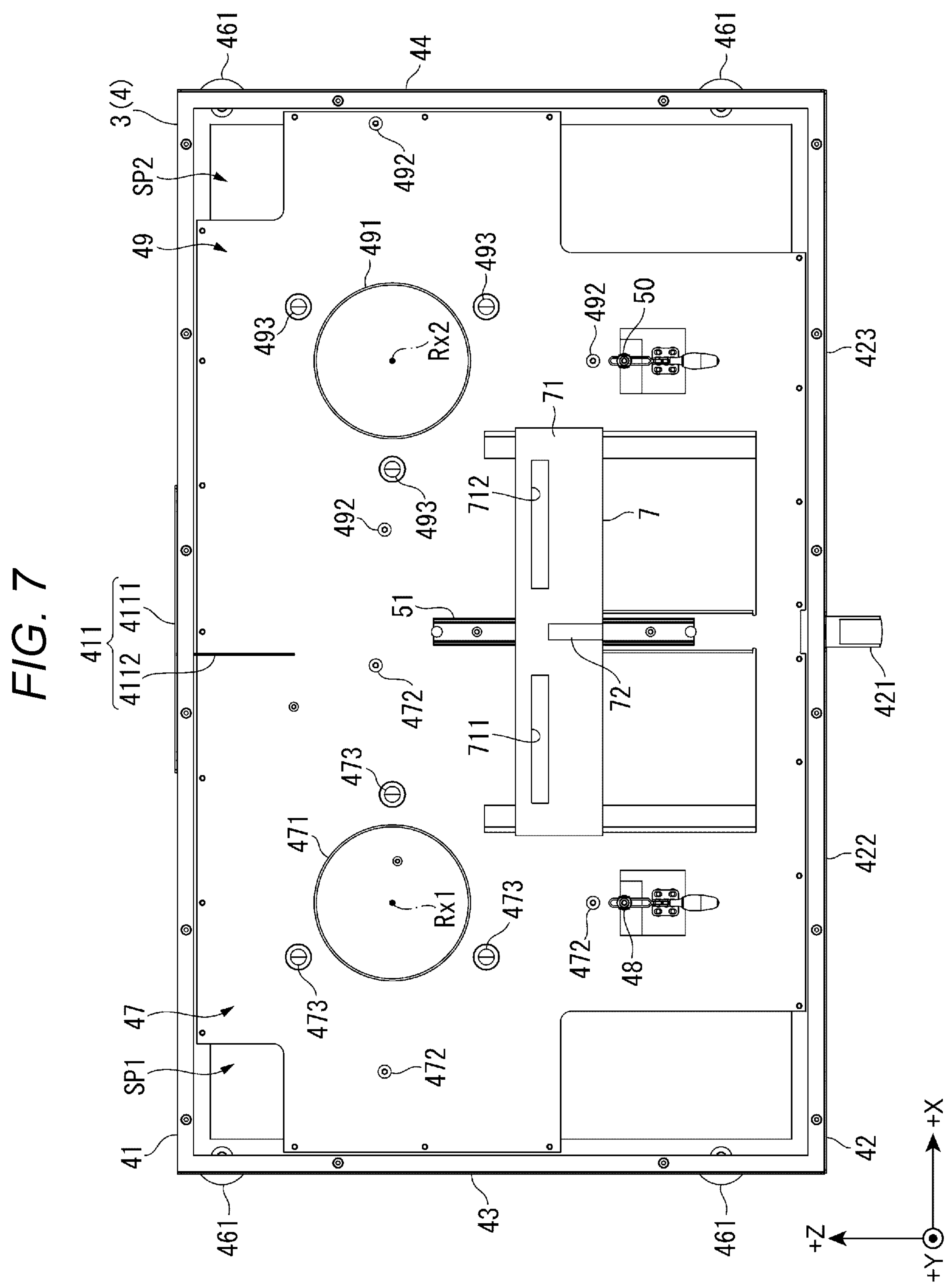
FIG. 7 is a plan view showing the inside of the position adjustment apparatus according to the embodiment in a state in which a projector and a rotary table are removed.

FIG. 7 is a plan view showing the inside of the position adjustment apparatus 3 when viewed from the +Y direction. Specifically, FIG. 7 is a plan view showing the inside of the position adjustment apparatus 3 in a state in which the projectors 2A and 2B and the rotary tables 6A and 6B are removed.

As shown in FIG. 7, a first support portion 47, a first fixing member 48, a second support portion 49, a second fixing member 50, and a slide rail 51 are provided at an inner surface 46A of the bottom surface 46. That is, the housing 4 includes the first support portion 47, the first fixing member 48, the second support portion 49, the second fixing member 50, and the slide rail 51 provided at the inner surface 46A.

The inner surface 46A of the bottom surface 46 refers to the inner surface 46A opposite to the bottom surface 46 among inner surfaces of the housing 4.

The first support portion 47 and the first fixing member 48 are disposed in an area in the −X direction at the inner surface 46A. In other words, the first support portion 47 and the first fixing member 48 are provided in the first space SP1 in the −X direction in the space in the housing 4.

The second support portion 49 and the second fixing member 50 are disposed in an area in the +X direction at the inner surface 46A. In other words, the second support portion 49 and the second fixing member 50 are provided in the second space SP2 in the +X direction in the space in the housing 4.

The first support portion 47 supports the first rotary table 6A, and the second support portion 49 supports the second rotary table 6B. The first support portion 47 includes a first cylindrical support portion 471, three first fixing portions 472, and three first rotation support portions 473. Similarly, the second support portion 49 includes a second cylindrical support portion 491, three second fixing portions 492, and three second rotation support portions 493.

Figure 8:
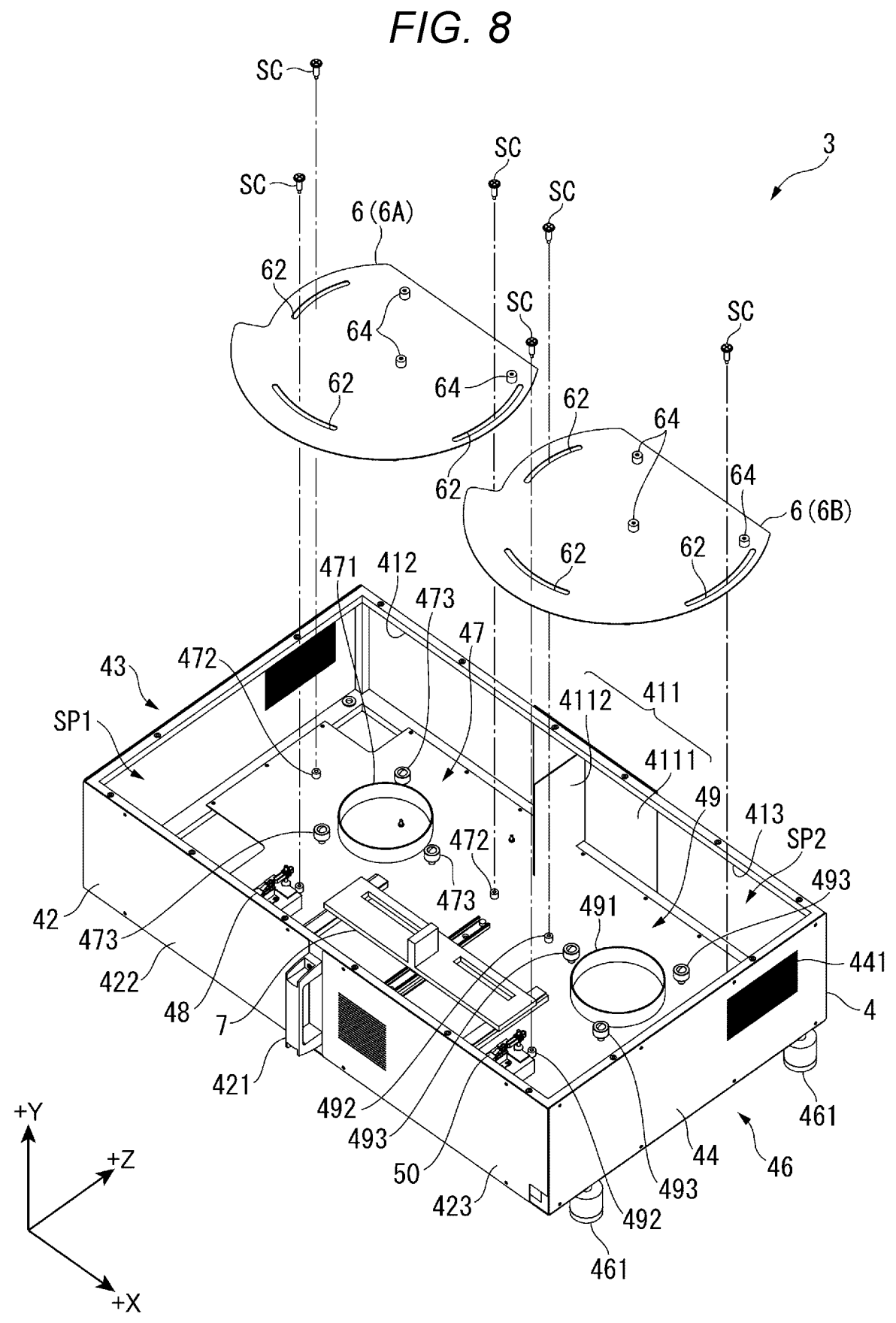

FIG. 8 is a perspective view showing the first rotary table 6A supported by the first support portion 47 and the second rotary table 6B supported by the second support portion 49.

As shown in FIGS. 7 and 8, each of the first cylindrical support portion 471 and the second cylindrical support portion 491 protrudes in a cylindrical shape from the inner surface 46A. The first cylindrical support portion 471 is inserted into a cylindrical portion 61 to be described later of the first rotary table 6A, and the second cylindrical support portion 491 is inserted into a cylindrical portion 61 to be described later of the second rotary table 6B.

An axis parallel to the Y-axis and passing through a center of the first cylindrical support portion 471 when viewed from the +Y direction is a first rotation axis Rx1 of the first rotary table 6A. An axis parallel to the Y-axis and passing through a center of the second cylindrical support portion 491 when viewed from the +Y direction is a second rotation axis Rx2 of the second rotary table 6B. In this way, the first rotation axis Rx1 and the second rotation axis Rx2 are parallel to each other. The first rotation axis Rx1 and the second rotation axis Rx2 being parallel to each other includes a case where the first rotation axis Rx1 and the second rotation axis Rx2 are substantially parallel to each other.

As shown in FIGS. 7 and 8, each of the three first fixing portions 472 is provided at a position in a circumferential direction about the first rotation axis Rx1. As shown in FIG. 8, each of the first fixing portions 472 is a screw hole into which a two-stage screw SC inserted through the first rotary table 6A from the +Y direction is inserted.

As shown in FIGS. 7 and 8, each of the three second fixing portions 492 is provided at a position in a circumferential direction about the second rotation axis Rx2. As shown in FIG. 8, each of the second fixing portions 492 fixes the two-stage screw SC inserted through the second rotary table 6B from the +Y direction.

The three first fixing portions 472 may not have the same distance from the first rotation axis Rx1, and the three second fixing portions 492 may not have the same distance from the second rotation axis Rx2.

As shown in FIGS. 7 and 8, each of the three first rotation support portions 473 is provided at a position in the circumferential direction about the first rotation axis Rx1. Each first rotation support portion 473 rotatably supports the first rotary table 6A from the −Y direction about the first rotation axis Rx1.

Each of the three second rotation support portions 493 is provided at a position in the circumferential direction about the second rotation axis Rx2. Each second rotation support portion 493 rotatably supports the second rotary table 6B from the −Y direction about the second rotation axis Rx2.

In the embodiment, the first rotation support portion 473 and the second rotation support portion 493 are implemented by free ball bearings. However, the disclosure is not limited thereto, and the first rotation support portion 473 and the second rotation support portion 493 may have other configurations, or the rotation support portions 473 and 493 may be omitted.

The three first rotation support portions 473 may not have the same distance from the first rotation axis Rx1, and the three second rotation support portions 493 may not have the same distance from the second rotation axis Rx2.

The first fixing member 48 presses the first rotary table 6A toward the inner surface 46A and fixes the first rotary table 6A in a rotation direction of the first rotary table 6A and a direction along the first rotation axis Rx1. The first fixing member 48 restricts rotation of the first rotary table 6A about the first rotation axis Rx1 and also restricts swinging of the first rotary table 6A in the +Y directions along the first rotation axis Rx1.

The second fixing member 50 presses the second rotary table 6B toward the inner surface 46A and fixes the second rotary table 6B in a rotation direction of the second rotary table 6B and a direction along the second rotation axis Rx2. The second fixing member 50 restricts rotation of the second rotary table 6B about the second rotation axis Rx2 and also restricts swinging of the second rotary table 6B in the +Y directions along the second rotation axis Rx2.

In the embodiment, the first fixing member 48 and the second fixing member 50 are implemented by toggle down clamps. However, the disclosure is not limited thereto, and the fixing members 48 and 50 may have other configurations, or the fixing members 48 and 50 may be omitted.

The slide rail 51 is disposed along the Z-axis substantially at a center of the inner surface 46A on the X-axis. The slide rail 51 slidably supports the operation lever 7 to be described later along the Z-axis, and also guides the sliding of the operation lever 7 along the Z-axis. In the embodiment, the slide rail 51 is provided as a configuration that guides the sliding of the operation lever 7, but the disclosure is not limited thereto, and, instead of the slide rail 51, a groove that engages with the operation lever 7 may be provided at the inner surface 46A along the Z-axis.

Configuration of First Rotary Table

Figure 9:
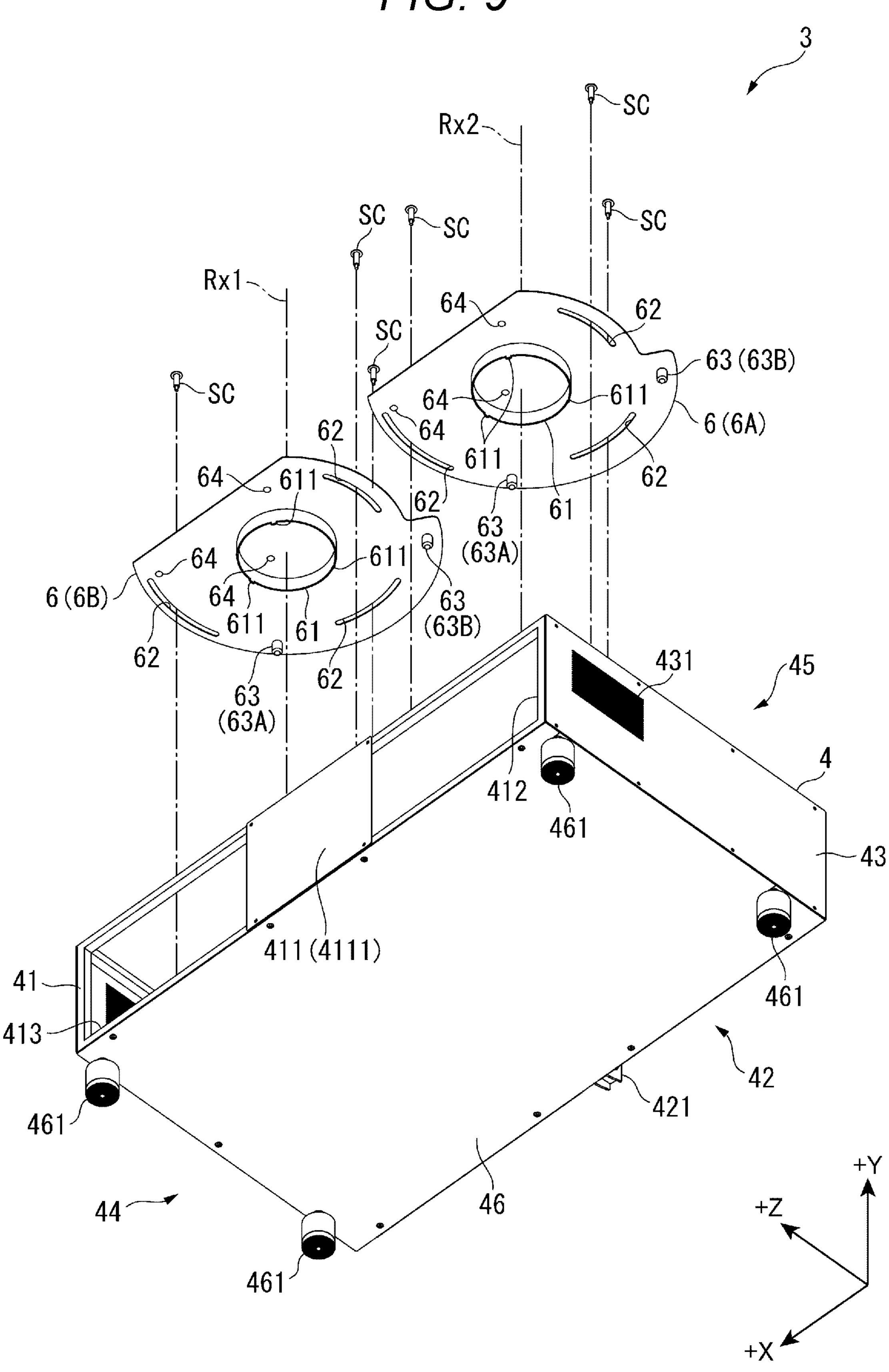
FIG. 9 is a perspective view showing the first rotary table and the second rotary table according to the embodiment.
Figure 10:
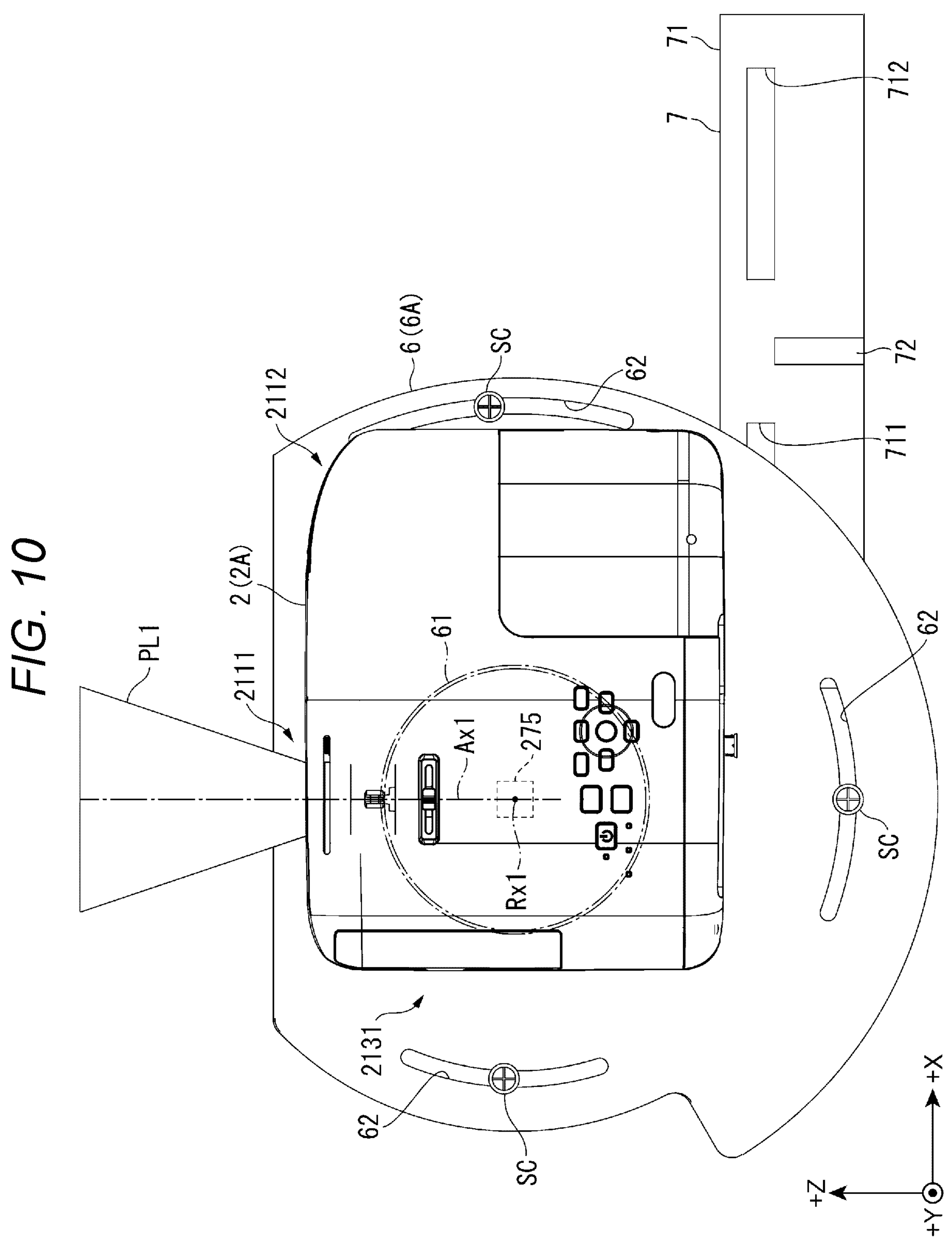
FIG. 10 is a plan view showing the first rotary table on which a first projector according to the embodiment is placed.

FIG. 9 is a perspective view showing the first rotary table 6A and the second rotary table 6B when viewed from the −Y direction. FIG. 10 is a plan view of the first rotary table 6A on which the first projector 2A is placed when viewed from the +Y direction, and FIG. 11 is a bottom view of the first rotary table 6A on which the first projector 2A is placed when viewed from the −Y direction.

The first rotary table 6A is rotatably supported by the first support portion 47 of the housing 4 about the first rotation axis Rx1. The first rotary table 6A includes the cylindrical portion 61 as shown in FIGS. 9 and 11 and further includes a guide groove 62, an engagement protrusion 63, and a fixing portion 64 as shown in FIGS. 9 to 11.

Figure 11:
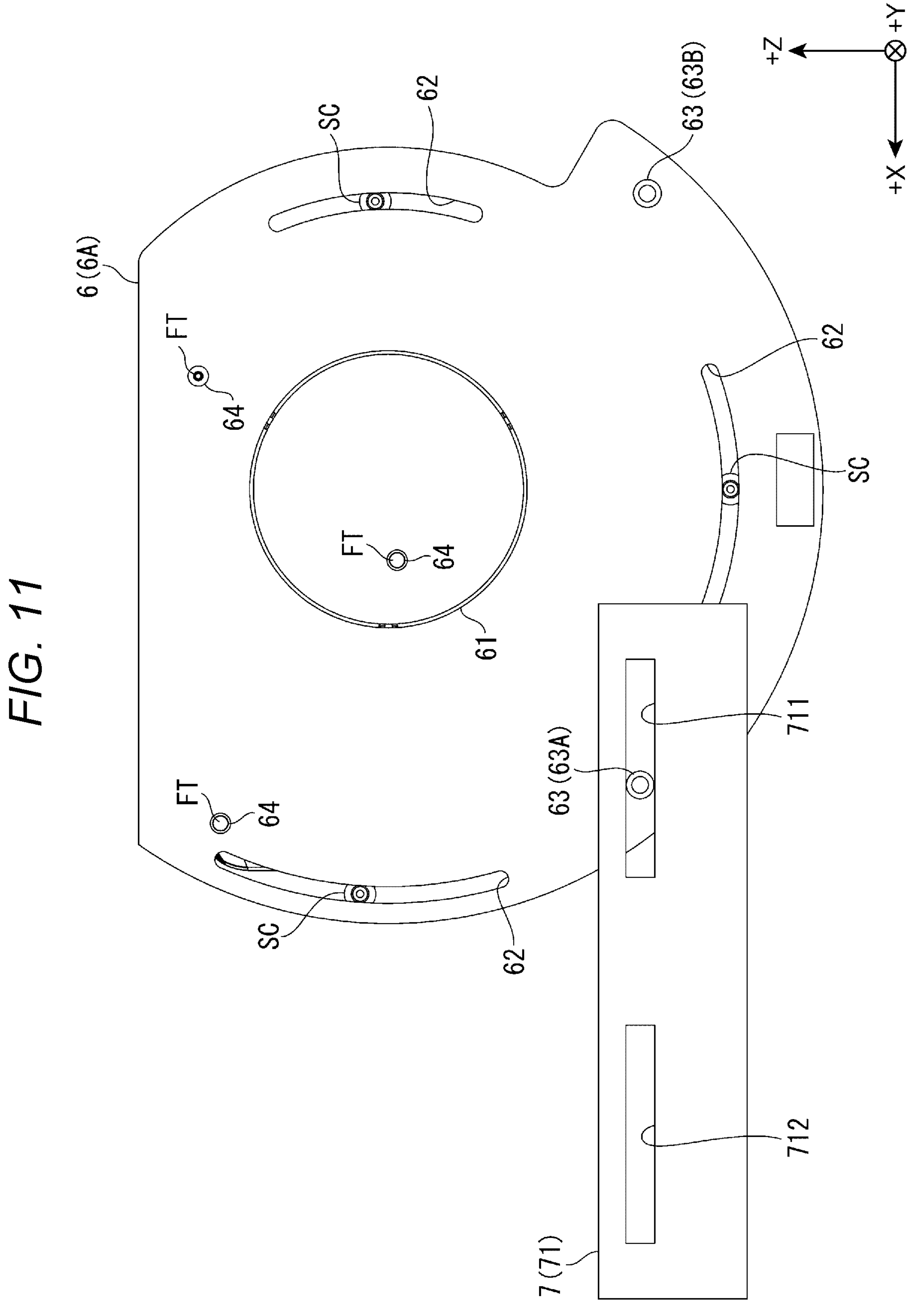
FIG. 11 is a bottom view showing the first rotary table on which the first projector according to the embodiment is placed.

As shown in FIGS. 9 and 11, the cylindrical portion 61 protrudes in the −Y direction substantially from a center of a surface of the first rotary table 6A in the −Y direction. The cylindrical portion 61 covers the first cylindrical support portion 471 when the first rotary table 6A is disposed at the first support portion 47. In other words, the first cylindrical support portion 471 is inserted into the cylindrical portion 61. The first rotation axis Rx1 of the first rotary table 6A is an axis that substantially passes through a center of the cylindrical portion 61 when viewed from the −Y direction and extends along the Y-axis.

As shown in FIG. 9, the cylindrical portion 61 includes a plurality of protruding portions 611. The plurality of protruding portions 611 are portions protruding in the −Y direction from a tip edge of the cylindrical portion 61, and three protruding portions 611 are provided at equal intervals at the tip edge of the cylindrical portion 61. The plurality of protruding portions 611 come into contact with the inner surface 46A when the first rotary table 6A is disposed at the first support portion 47, and thus reduce sliding resistance of the first rotary table 6A.

As shown in FIGS. 9 to 11, the guide groove 62 is an arc-shaped opening formed along a concentric circle centered on the first rotation axis Rx1, and three guide grooves 62 are provided at the first rotary table 6A. The two-stage screw SC is inserted into each guide groove 62 from the +Y direction. In a state in which the first rotary table 6A is disposed at the first support portion 47, the two-stage screw SC is fixed to a corresponding first fixing portion 472 among the three first fixing portions 472, and thus the first rotary table 6A is rotatably supported by the first support portion 47 about the first rotation axis Rx1.

In this way, when the first rotary table 6A is supported by the first support portion 47, each first rotation support portion 473 of the first support portion 47 comes into contact with the surface of the first rotary table 6A in the −Y direction.

The engagement protrusion 63 is provided on each of end portions of the first rotary table 6A in the +X direction and the −X direction. That is, the two engagement protrusions 63 include a first engagement protrusion 63A provided in the +X direction and a second engagement protrusion 63B provided in the −X direction.

On the first rotary table 6A, the first engagement protrusion 63A is inserted from the +Y direction into a first coupling portion 711 to be described later of the operation lever 7. Accordingly, the first rotary table 6A and the operation lever 7 are coupled.

Three fixing portions 64 are provided at the first rotary table 6A. One of the three fixing portions 64 corresponds to a first fixing portion, and another one corresponds to a second fixing portion.

The fixing portion 64 is a hole portion through which a fixing tool FT inserted from the −Y direction is inserted into the first projector 2A placed on a surface of the first rotary table 6A in the +Y direction. That is, the position adjustment apparatus 3 includes three fixing tools FT that are provided according to the fixing portion 64 to fix the first projector 2A to the first rotary table 6A. One of the three fixing tools FT corresponds to a first fixing tool, and another one corresponds to a second fixing tool.

In the embodiment, the fixing tool FT is a screw, and the fixing tool FT is inserted through the fixing portion 64 from the −Y direction and thus inserted into a screw hole provided at a bottom surface of the first projector 2A, whereby the first rotary table 6A and the first projector 2A are integrated.

The screw hole provided at the bottom surface of the first projector 2A is a screw hole to which a fixing tool for fixing the first projector 2A to a fixture supporting the first projector 2A in a suspended state is fixed. That is, in the embodiment, the screw hole for fixing the fixture supporting the first projector 2A and the screw hole for fixing the first rotary table 6A integrated with the first projector 2A are used in common.

Configuration of Second Rotary Table

The second rotary table 6B is rotatably supported by the second support portion 49 about the second rotation axis Rx2 parallel to the first rotation axis Rx1. As shown in FIG. 9, the second rotary table 6B includes the cylindrical portion 61, the guide groove 62, the engagement protrusion 63, and the fixing portion 64, which are the same as the cylindrical portion 61, the guide groove 62, the engagement protrusion 63, and the fixing portion 64 of the first rotary table 6A. That is, the first rotary table 6A and the second rotary table 6B have the same configuration.

On the second rotary table 6B, the second cylindrical support portion 491 of the second support portion 49 is inserted into the cylindrical portion 61 from the −Y direction, and the two-stage screw SC inserted into the second fixing portion 492 of the second support portion 49 is inserted into the guide groove 62 from the +Y direction.

On the second rotary table 6B, the second engagement protrusion 63B in the −X direction among the engagement protrusions 63 is coupled to a second coupling portion 712 to be described later of the operation lever 7, and the fixing tool FT for fixing the second rotary table 6B to the second projector 2B is inserted into the fixing portion 64. The fixing portion 64 of the second rotary table 6B corresponds to the second fixing portion.

Configuration of Operation Lever

As shown in FIG. 7, the operation lever 7 is coupled to the slide rail 51 and is provided at the inner surface 46A in a manner that is slidable along the Z-axis. The operation lever 7 includes a coupling portion 71 and a grip portion 72.

The coupling portion 71 extends along the X-axis and is coupled to the slide rail 51. That is, the coupling portion 71 is provided at the inner surface 46A in a manner that is slidable in the +Z directions intersecting the coupling portion 71. The coupling portion 71 is coupled to the first rotary table 6A and the second rotary table 6B. Specifically, the coupling portion 71 includes the first coupling portion 711 coupled to the first rotary table 6A and the second coupling portion 712 coupled to the second rotary table 6B.

The first coupling portion 711 is provided at a portion of the coupling portion 71 in the −X direction, and the second coupling portion 712 is provided at a portion of the coupling portion 71 in the +X direction. In the embodiment, each of the coupling portions 711 and 712 is a slit extending along the X-axis, the first engagement protrusion 63A of the first rotary table 6A is inserted into the first coupling portion 711, and the second engagement protrusion 63B of the second rotary table 6B is inserted into the second coupling portion 712.

The grip portion 72 is a handle to be gripped by a user and is provided at the coupling portion 71. The grip portion 72 protrudes from the coupling portion 71 in the +Y direction.

Figure 12:
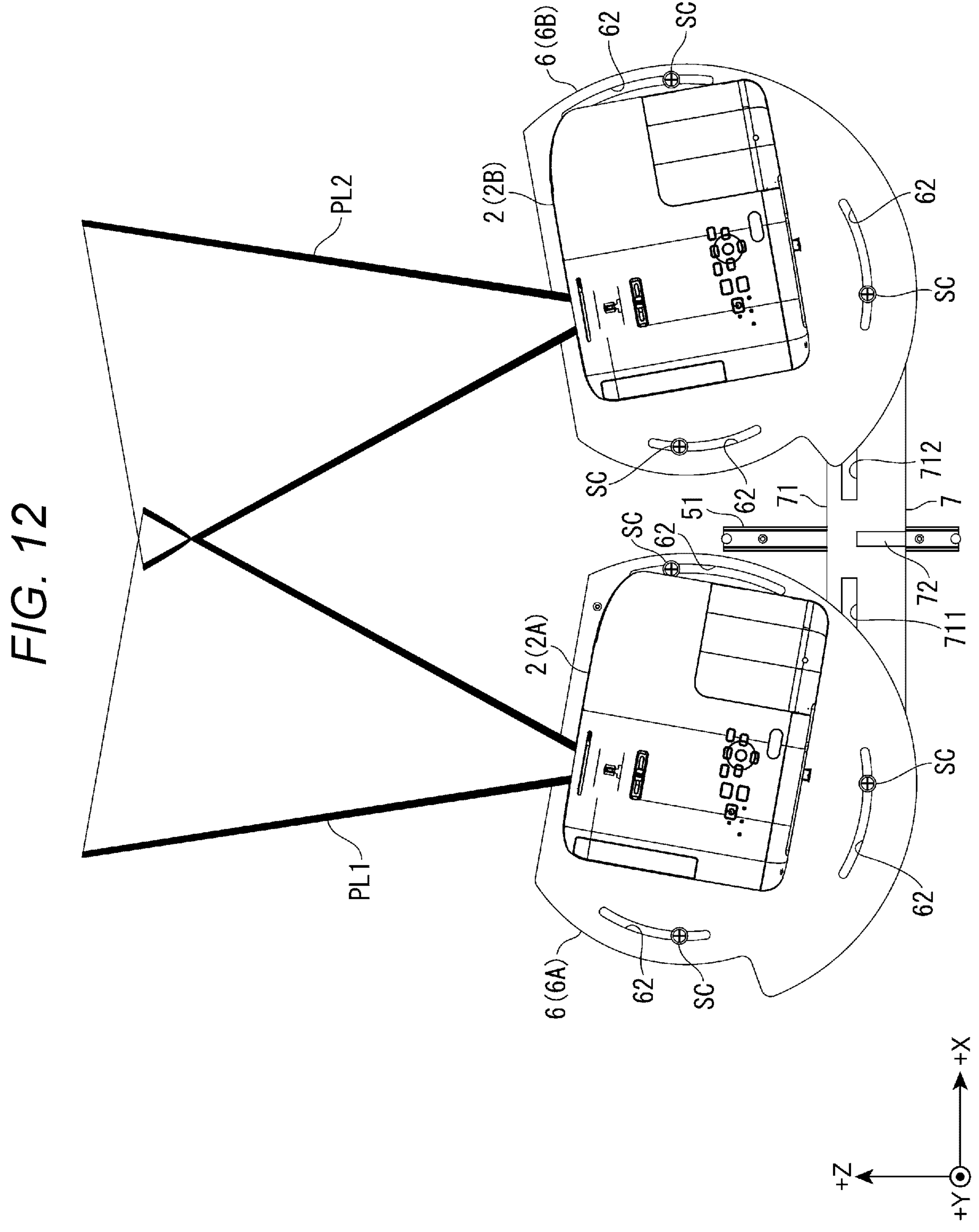
FIG. 12 shows a rotation state of each projector when an operation lever according to the embodiment is slid.

FIG. 12 shows a rotation state of each of the first rotary table 6A and the second rotary table 6B when the operation lever 7 is slid in the −Z direction. That is, FIG. 12 shows a rotation state of each of the first projector 2A and the second projector 2B when the operation lever 7 is slid in the −Z direction.

When the operation lever 7 is slid in the −Z direction, the first rotary table 6A coupled by the first coupling portion 711 rotates clockwise when viewed from the +Y direction, and the second rotary table 6B coupled by the second coupling portion 712 rotates counterclockwise when viewed from the +Y direction.

In this case, a projection direction of the first image light PL1 and a projection direction of the second image light PL2 are close to each other, and thus an image whose X-axis dimension is relatively small is displayed on the projection surface.

Figure 13:
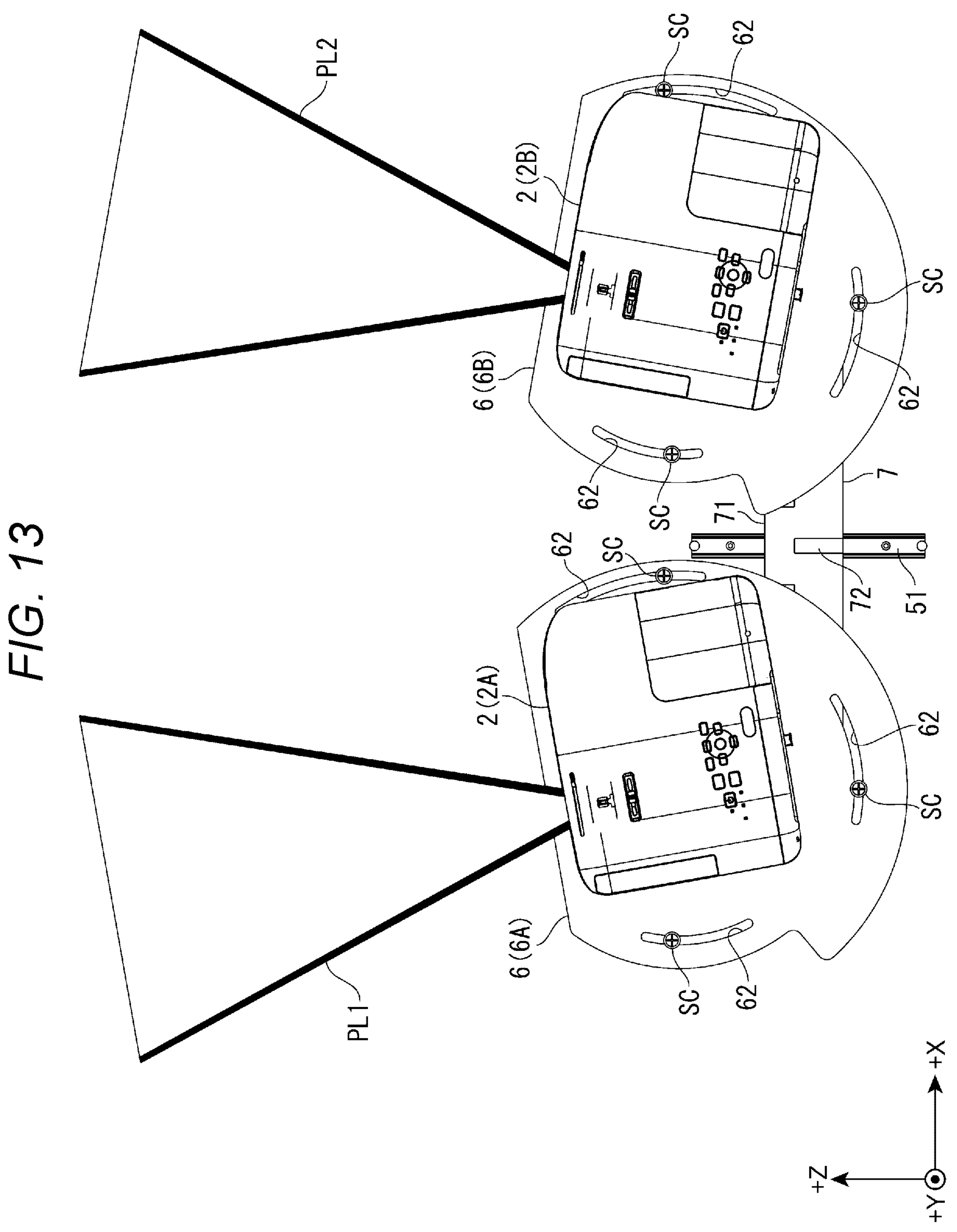
FIG. 13 shows the rotation state of each projector when the operation lever according to the embodiment is slid.

FIG. 13 shows a rotation state of each of the first rotary table 6A and the second rotary table 6B when the operation lever 7 is slid in the +Z direction. That is, FIG. 13 shows a rotation state of each of the first projector 2A and the second projector 2B when the operation lever 7 is slid in the +Z direction.

When the operation lever 7 is slid in the +Z direction, the first rotary table 6A coupled by the first coupling portion 711 rotates counterclockwise when viewed from the +Y direction, and the second rotary table 6B coupled by the second coupling portion 712 rotates clockwise when viewed from the +Y direction.

In this case, the projection direction of the first image light PL1 and the projection direction of the second image light PL2 are apart from each other, and thus an image whose X-axis dimension is relatively large is displayed on the projection surface.

In this way, by sliding the operation lever 7 along the Z-axis, the first rotary table 6A and the second rotary table 6B can be rotated in synchronization with each other in opposite directions, and a size of the image on the projection surface can be easily adjusted.

Here, the first rotation axis Rx1 of the first rotary table 6A is set not only in parallel to the second rotation axis Rx2 of the second rotary table 6B, but also at a position intersecting an optical axis Ax1 of the projection optical apparatus 28 of the first projector 2A inside the first projector 2A as shown in FIG. 10. That is, the first rotation axis Rx1 is disposed on the optical axis Ax1 of the projection optical apparatus 28 of the first projector 2A and overlaps the optical axis Ax1 when the first rotary table 6A is viewed along the first rotation axis Rx1. Specifically, the first rotation axis Rx1 is set at a position overlapping the light combiner 275 of the first projector 2A when the first rotary table 6A is viewed along the first rotation axis Rx1.

Although not shown, the second rotation axis Rx2 of the second rotary table 6B is also set in the same manner at a position intersecting the optical axis Ax1 of the projection optical apparatus 28 of the second projector 2B inside the second projector 2B. That is, the second rotation axis Rx2 is disposed on the optical axis Ax1 of the projection optical apparatus 28 of the second projector 2B and overlaps the optical axis Ax1 when the second rotary table 6B is viewed along the second rotation axis Rx2. Specifically, the second rotation axis Rx2 is set at a position overlapping the light combiner 275 of the second projector 2B when the second rotary table 6B is viewed along the second rotation axis Rx2.

Therefore, when the first rotary table 6A and the second rotary table 6B are rotated by the same angle, a movement amount of a projection position of the first image light PL1 on the projection surface can substantially match a movement amount of a projection position of the second image light PL2 on the projection surface. Accordingly, the size of the image formed by each of the first image light and the second image light on the projection surface can be easily adjusted.

Figure 14:
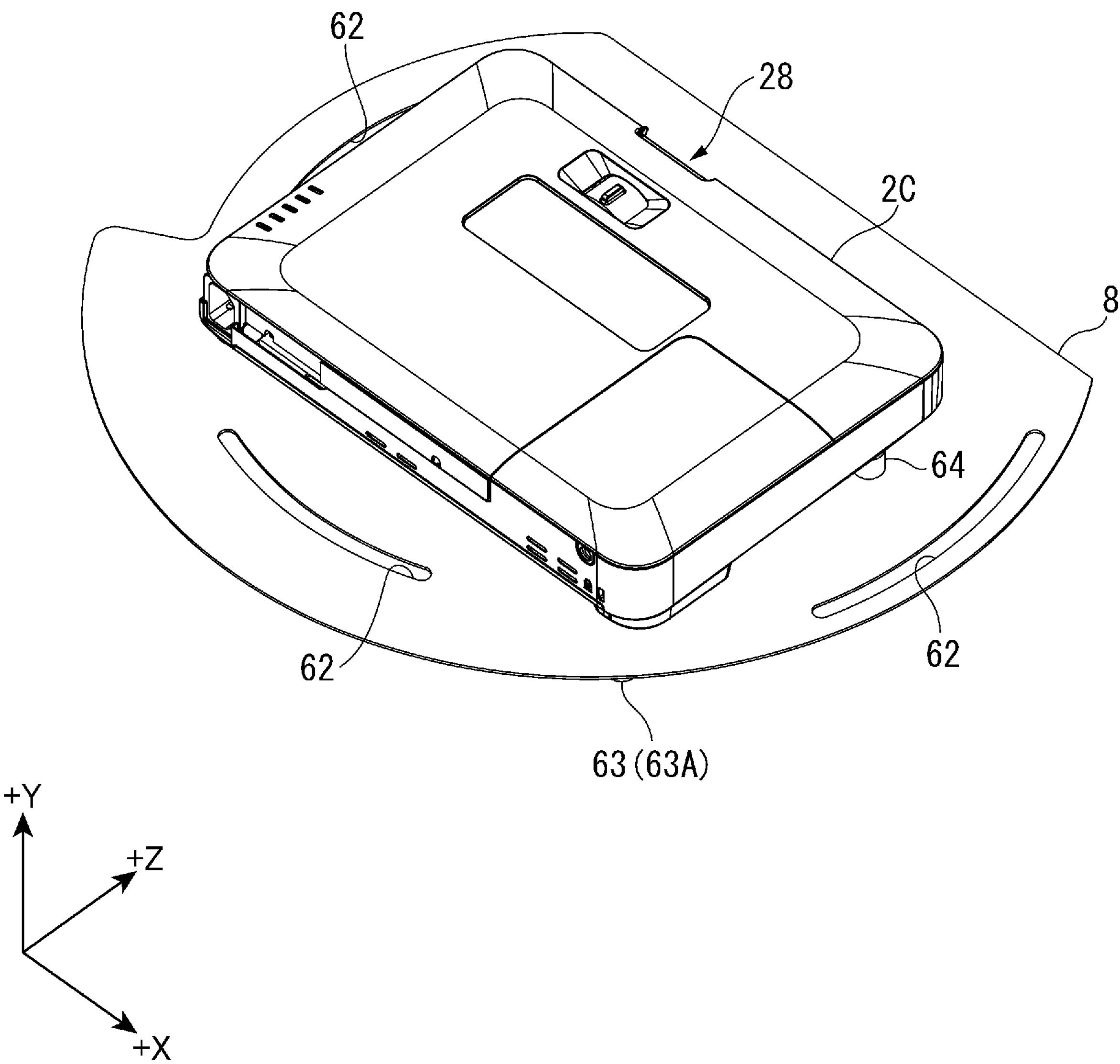
FIG. 14 is a perspective view showing a projector of another model and a rotary table according to the embodiment.
Figure 15:
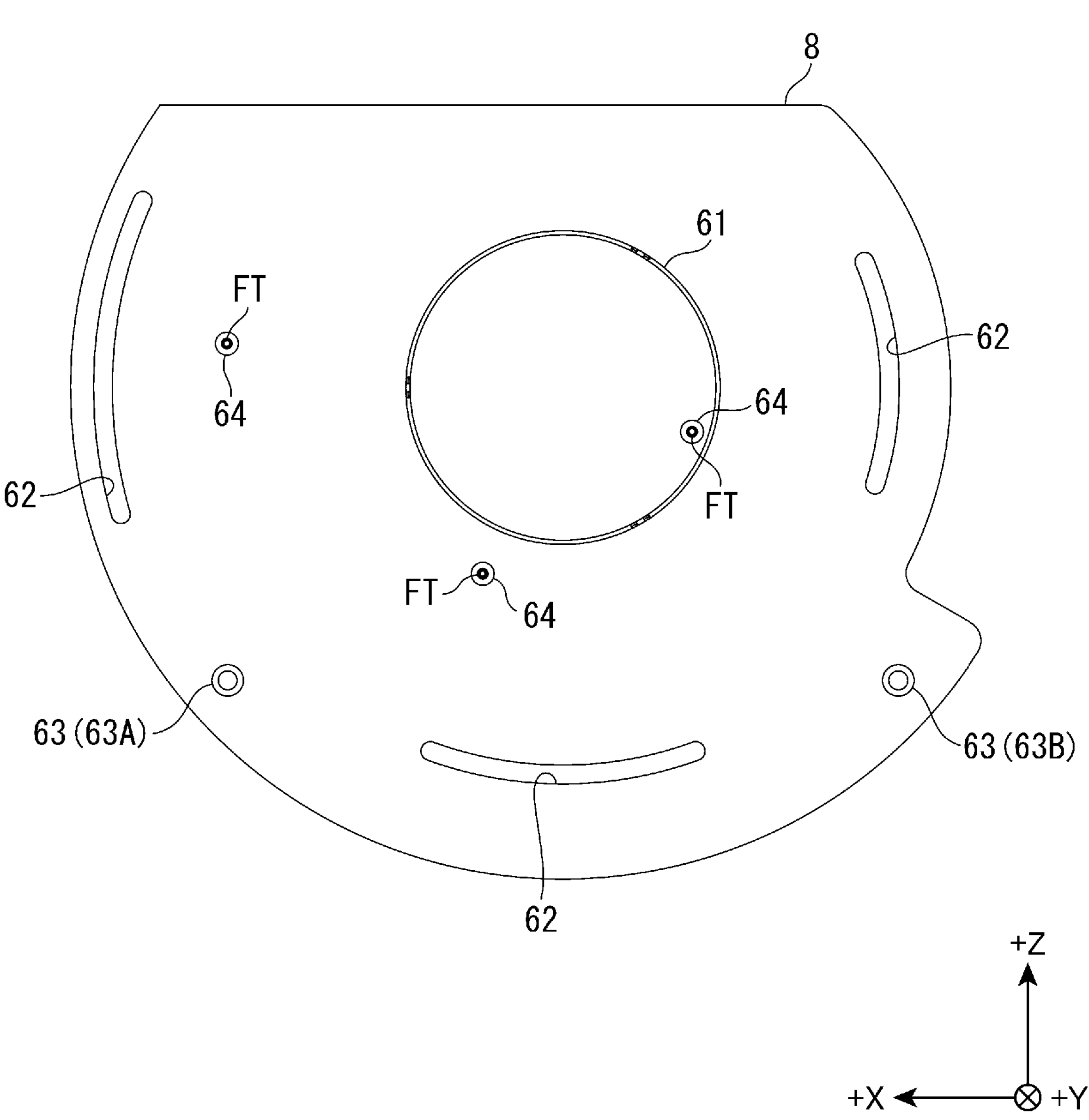
FIG. 15 is a bottom view showing the projector of the other model and the rotary table according to the embodiment.

FIG. 14 is a perspective view showing a projector 2C of another model and a rotary table 8 corresponding to the projector 2C. FIG. 15 shows the rotary table 8 when viewed from the −Y direction.

Here, a model of the projector 2 fixed to the rotary table 6 is determined by a disposition of the fixing portion 64. In other words, when a projector of a model different from that described above is adopted as the projector integrated with the rotary table 6, a rotary table corresponding to the projector is adopted.

For example, instead of the projector 2 and the rotary table 6, the projector 2C and the rotary table 8 shown in FIG. 14 can be set in the housing 4 of the position adjustment apparatus 3. The rotary table 8 has the same shape as that of the rotary table 6, and as shown in FIG. 15, includes the cylindrical portion 61, the guide groove 62, the engagement protrusion 63, and the fixing portion 64, which are the same as those of the rotary table 6. However, positions of three fixing portions 64 of the rotary table 8 are different from positions of the three fixing portions 64 of the rotary table 6. This is because the projector 2C is disposed and fixed at a predetermined position on the rotary table 8.

Specifically, on each of the rotary tables 6 and 8, the positions of the plurality of fixing portions 64 through which the fixing tools FT are inserted are defined according to fixture-fixing screw holes provided at a bottom surface of each projector when the rotation axis of the rotary table intersects the optical axis of the projection optical apparatus 28 of the projector integrated with the rotary table inside the projector.

On the first rotary table 6A according to the embodiment, as shown in FIG. 10, the positions of the plurality of fixing portions 64 are defined according to fixture-fixing screw holes provided at the bottom surface of the first projector 2A when the first rotation axis Rx1 of the first rotary table 6A is located on the optical axis Ax1 of the projection optical apparatus 28 of the first projector 2A and overlaps the light combiner 275. The same applies to the second rotary table 6B and the rotary table 8.

Therefore, when the first projector 2A is fixed to the first rotary table 6A by the plurality of fixing portions 64, the first rotation axis Rx1 overlaps the optical axis Ax1 of the projection optical apparatus 28 of the first projector 2A and overlaps the light combiner 275 of the first projector 2A when viewed along the first rotation axis Rx1 of the first rotary table 6A. The same applies to the second rotary table 6B and the second projector 2B. When the projector 2C is fixed to the rotary table 8 by the plurality of fixing portions 64, a rotation axis of the rotary table 8 overlaps the optical axis Ax1 of the projection optical apparatus 28 of the projector 2C and overlaps the light combiner 275 of the projector 2C when viewed along the rotation axis of the rotary table 8.

Since the rotary tables 6 and 8 are configured in this way, and projectors of the same model are adopted on the two rotary tables adopted in the position adjustment apparatus 3, as described above, when the rotary tables are rotated by the same angle in opposite directions, a movement distance of image light projected from each projector 2 on the projection surface can be made the same distance.

When at least one of the first projector 2A and the second projector 2B is replaced, the projector and the rotary table to be replaced can be removed from the first support portion 47 or the second support portion 49 by removing the two-stage screw SC. At this time, a detachment direction of the two-stage screw SC is the +Y direction, and a removal direction of the projector and the rotary table to be replaced is the +Y direction. The top plate 451 constituting the top surface 45 is also detachable in the +Y direction.

Therefore, in a state in which the top plate 451 is removed from the housing 4, the two-stage screw SC and the rotary table on which the projector to be replaced is placed can be accessed and removed from the +Y direction. Accordingly, a replacement operation of the projector can be easily performed.

Effects of Embodiment

The projection system 1 according to the embodiment described above has the following effects.

The projection system 1 includes the first projector 2A that projects the first image light PL1, the second projector 2B that projects the second image light PL2, and the position adjustment apparatus 3.

The position adjustment apparatus 3 includes the housing 4, the first rotary table 6A, and the second rotary table 6B.

The housing 4 includes the first space SP1 in which the first projector 2A is disposed and the second space SP2 in which the second projector 2B is disposed.

The first projector 2A is placed on the first rotary table 6A. The first rotary table 6A is rotatably supported by the housing 4 about the first rotation axis Rx1.

The second projector 2B is placed on the second rotary table 6B. The second rotary table 6B is rotatably supported by the housing 4 about the second rotation axis Rx2 parallel to the first rotation axis Rx1.

The housing 4 includes the first opening 412 through which the first image light PL1 projected from the first projector 2A passes and the second opening 413 through which the second image light PL2 projected from the second projector 2B passes.

The rotation direction of the first rotary table 6A and the rotation direction of the second rotary table 6B when the operation lever 7 is operated are opposite to each other, and the rotation of the first rotary table 6A and the rotation of the second rotary table 6B are in conjunction with each other.

The first rotary table 6A and the second rotary table 6B are configured to be replaceable with respect to the housing 4.

According to such a configuration, since the first rotary table 6A on which the first projector 2A is placed and the second rotary table 6B on which the second projector 2B is placed rotate in opposite directions in conjunction with each other, it is not necessary to individually adjust the projection positions of the image light PL1 and PL2 projected from the respective projectors 2A and 2B. Accordingly, since a display position of an image that is projected from each of the projectors 2A and 2B and displayed on the projection surface can be easily adjusted, an operation of adjusting the display position can be simplified. Further, a projection system that can easily adjust a size of a display screen can be implemented.

By replacing the first rotary table 6A and the second rotary table 6B, it is possible to dispose projectors of different models as the first projector 2A and the second projector 2B in the position adjustment apparatus 3.

The position adjustment apparatus 3 includes the plurality of fixing tools FT that fix the first projector 2A to the first rotary table 6A. Among the plurality of fixing tools FT, one fixing tool FT corresponds to the first fixing tool, and another fixing tool FT corresponds to the second fixing tool.

The first rotary table 6A includes the plurality of fixing portions 64 to which the first projector 2A is fixed by the fixing tools FT. Among the plurality of fixing portions 64, one fixing portion 64 corresponds to the first fixing portion, and another fixing portion 64 corresponds to the second fixing portion.

Each fixing portion 64 is disposed at a position where the optical axis Ax1 of the projection optical apparatus 28 that projects the first image light PL1 overlaps the first rotation axis Rx1 in the first projector 2A when the first rotary table 6A is viewed along the first rotation axis Rx1. That is, each fixing portion 64 is disposed at a position where the optical axis Ax1 of the projection optical apparatus 28 of the first projector 2A overlaps the first rotation axis Rx1 when the first rotary table 6A is viewed from the +Y direction.

The same applies to the fixing portion 64 and the fixing tool FT of the second rotary table 6B.

According to such a configuration, when the first rotary table 6A and the second rotary table 6B are rotated by the same angle, the movement amount of the projection position of the first image light PL1 on the projection surface can be easily matched with the movement amount of the projection position of the second image light PL2 on the projection surface. Accordingly, a size of an image formed by each of the first image light PL1 and the second image light PL2 on the projection surface can be easily adjusted.

The position adjustment apparatus 3 includes the plurality of fixing tools FT that fix the first projector 2A to the first rotary table 6A. Among the plurality of fixing tools FT, one fixing tool FT corresponds to the first fixing tool, and another fixing tool FT corresponds to the second fixing tool.

The first rotary table 6A includes the plurality of fixing portions 64 to which the first projector is fixed by the fixing tools FT. Among the plurality of fixing portions 64, one fixing portion 64 corresponds to the first fixing portion, and another fixing portion 64 corresponds to the second fixing portion.

When the first rotary table 6A to which the first projector 2A is fixed is viewed along the first rotation axis Rx1, each fixing portion 64 is disposed at a position where the first rotation axis Rx1 overlaps the light combiner 275 that combines light emitted from the plurality of light modulators 273 in the first projector 2A. That is, each fixing portion 64 is disposed at a position where the first rotation axis Rx1 overlaps the light combiner 275 when the first rotary table 6A is viewed from the +Y direction.

The same applies to the fixing portion 64 and the fixing tool FT of the second rotary table 6B.

According to such a configuration, when the first rotary table 6A and the second rotary table 6B are rotated by the same angle, the movement amount of the projection position of the first image light PL1 on the projection surface can substantially match the movement amount of the projection position of the second image light PL2 on the projection surface. Accordingly, a size of an image formed by each of the first image light PL1 and the second image light PL2 on the projection surface can be easily adjusted.

The position adjustment apparatus 3 includes the operation lever 7 slidable by the user. The operation lever 7 rotates the first rotary table 6A and the second rotary table 6B in conjunction with each other.

According to such a configuration, by operating the operation lever 7, the first rotary table 6A and the second rotary table 6B can be rotated in opposite directions in conjunction with each other, and a rotation angle of the first rotary table 6A and a rotation angle of the second rotary table 6B can be easily matched with each other. Accordingly, a display position of an image related to each image light can be easily adjusted.

In the position adjustment apparatus 3, the operation lever 7 includes the coupling portion 71 and the grip portion 72.

The coupling portion 71 is coupled to the first rotary table 6A and the second rotary table 6B. The coupling portion 71 is provided in the housing 4 in a manner that is slidable in the +Z directions intersecting the coupling portion 71. The coupling portion 71 is provided with the grip portion 72. The grip portion 72 is a portion to be gripped by the user.

According to such a configuration, the user can simultaneously rotate the first rotary table 6A and the second rotary table 6B in conjunction with each other by gripping the grip portion 72 and sliding the operation lever 7. Accordingly, the first rotary table 6A and the second rotary table 6B can be easily rotated, and thus a display position of an image related to each image light can be easily adjusted.

In the position adjustment apparatus 3, by removing the first rear surface portion 422 from the housing 4, the operation lever 7 is operable from the rear surface 42 on a side opposite to the front surface 41 where the first opening 412 and the second opening 413 are provided at the housing 4.

According to such a configuration, the user can operate the operation lever 7 without blocking the first image light PL1 and the second image light PL2 projected onto the projection surface. Accordingly, the projection position of each image light can be adjusted by operating the operation lever 7 while checking the projection position of each of the first image light PL1 and the second image light PL2 on the projection surface. Accordingly, a display position of an image related to each image light can be easily adjusted.

In the position adjustment apparatus 3, the housing 4 is configured such that the first projector 2A and the first rotary table 6A, and the second projector 2B and the second rotary table 6B are removable from the top surface 45 side of the housing 4. That is, the top plate 451 constituting the top surface 45 of the housing 4 is attachable to and detachable from the housing 4, and the two-stage screw SC for attaching the rotary tables 6A and 6B to the housing 4 is inserted into each of the fixing portions 472 and 492 of the housing 4 from the +Y direction that is the top surface 45 side.

According to such a configuration, the first rotary table 6A on which the first projector 2A is disposed and the second rotary table 6B on which the second projector 2B is disposed can be easily attached to and detached from the housing 4. Accordingly, a replacement operation of the projectors 2A and 2B and the rotary tables 6A and 6B can be easily performed.

The position adjustment apparatus 3 includes the first fixing member 48 and the second fixing member 50.

The first fixing member 48 fixes the first rotary table 6A in the rotation direction of the first rotary table 6A and the direction along the first rotation axis Rx1.

The second fixing member 50 fixes the second rotary table 6B in the rotation direction of the second rotary table 6B and the direction along the second rotation axis Rx2.

According to such a configuration, since the first rotary table 6A and the second rotary table 6B after position adjustment can be fixed, positions of the projectors 2A and 2B can be fixed, and thus a projection position of an image on the projection surface can be fixed.

In the position adjustment apparatus 3, the housing 4 includes the partition wall 4511 that partitions the first space SP1 and the second space SP2.

According to such a configuration, it is possible to prevent heat of the projector 2 disposed in one of the first space SP1 and the second space SP2 from influencing the projector 2 disposed in the other space.

In the position adjustment apparatus 3, the housing 4 includes the first introduction port 431, the first discharge port 452, the second introduction port 424, and the second discharge port 441.

The first introduction port 431 establishes communication between the first space SP1 and the outside of the housing 4 and introduces air outside the housing 4 into the first space SP1. The first discharge port 452 establishes communication between the first space SP1 and the outside of the housing 4, and discharges air inside the first space SP1 to the outside of the housing 4.

The second introduction port 424 establishes communication between the second space SP2 and the outside of the housing 4 and introduces air outside the housing 4 into the second space SP2. The second discharge port 441 establishes communication between the second space SP2 and the outside of the housing 4, and discharges air inside the second space SP2 to the outside of the housing 4.

According to such a configuration, a flow system of air flowing in the first space SP1 in which the first projector 2A is disposed and a flow system of air flowing in the second space SP2 in which the second projector 2B is disposed can be independent of each other. Therefore, it is possible to prevent heat of air flowing in one of the first space SP1 and the second space SP2 from influencing air flowing in the other space. Accordingly, the projectors 2A and 2B can be efficiently cooled.

In the position adjustment apparatus 3, the first discharge port 452 is provided at a position on the second space SP2 side at the top surface 45 of the housing 4. The housing 4 includes the guide wall 411 that is disposed between the first opening 412 and the second opening 413 and guides air inside the first space SP1 to the first discharge port 452.

According to such a configuration, for example, even when discharged air from the first projector 2A is directed toward the second space SP2 side, the discharged air can be guided to the first discharge port 452 by the guide wall 411. Accordingly, it is possible to prevent the discharged air of the first projector 2A from flowing into the second space SP2 and influencing the second projector 2B disposed in the second space SP2.

Modification of Embodiment

The disclosure is not limited to the above-described embodiment, and modifications, improvements, and the like within a range in which the object of the disclosure can be achieved are included in the disclosure.

In the above-described embodiment, in the position adjustment apparatus 3, the first opening 412 and the second opening 413 are separated from each other in the X-axis by the guide wall 411. However, the disclosure is not limited thereto, and the first opening 412 and the second opening 413 may be a single continuous opening. That is, the first opening 412 and the second opening 413 may each be a partial area in the one opening.

According to such a configuration, it is not necessary to provide a member such as the guide wall 411 for partitioning the first opening 412 and the second opening 413. Accordingly, the configuration of the housing 4 and the configuration of the position adjustment apparatus 3 can be simplified.

When the first opening 412 and the second opening 413 are partial areas in the one opening, the guide wall 411 may be omitted. Alternatively, the guide wall may be provided in the housing 4 as long as discharged air from the projector 2 can be guided without separating the first opening 412 and the second opening 413.

In the above-described embodiment, the position adjustment apparatus 3 includes the first fixing member 48 that fixes the first rotary table 6A and the second fixing member 50 that fixes the second rotary table 6B. Alternatively, the position adjustment apparatus 3 may include a fixing member that fixes the operation lever 7 slidable along the Z-axis, instead of the first fixing member 48 and the second fixing member 50 or in addition to the first fixing member 48 and the second fixing member 50. Specifically, the position adjustment apparatus 3 may include a fixing member that fixes the operation lever 7 in a sliding direction of the operation lever 7.

According to such a configuration, since a position of the operation lever 7 can be fixed, the first rotary table 6A and the second rotary table 6B rotated by the operation lever 7 can be fixed. Accordingly, the positions of the projectors 2A and 2B can be fixed, and thus a projection position of an image on the projection surface can be fixed.

In the above-described embodiment, the first rotation axis Rx1 of the first rotary table 6A intersects the optical axis Ax1 of the projection optical apparatus 28 of the first projector 2A placed on the first rotary table 6A and is parallel to the Y-axis. Specifically, the first rotation axis Rx1 is set at a position overlapping the light combiner 275 of the first projector 2A when viewed along the first rotation axis Rx1.

However, the first rotation axis Rx1 is not limited thereto and may not overlap the optical axis Ax1 of the projection optical apparatus 28 or may not overlap the light combiner 275 when viewed along the first rotation axis Rx1. Even when the first rotation axis Rx1 overlaps the optical axis Ax1, the first rotation axis Rx1 may not completely overlap the optical axis Ax1. That is, when viewed along the first rotation axis Rx1, the first rotation axis Rx1 may be set at a position that seemingly overlaps the optical axis Ax1.

When viewed along the first rotation axis Rx1, the first rotation axis Rx1 may not overlap the light combiner 275 and may not overlap the optical axis Ax1 of the projection optical apparatus 28 even when the first rotation axis Rx1 overlaps the light combiner 275.

The same applies to the second rotation axis Rx2.

In the above-described embodiment, the fixing portions 64 of the rotary tables 6 and 8 are hole portions through which the fixing tools FT, which are screws fixed to the projector 2, are inserted. However, the fixing portions 64 are not limited thereto, and a configuration thereof is not limited to that described above as long as the projector 2 can be fixed.

The fixing portions 64 may be able to fix the projectors 2 placed on the rotary tables 6 and 8 at any position.

In the above-described embodiment, the operation lever 7 that enables the rotation of the first rotary table 6A to be in conjunction with the rotation of the second rotary table 6B is provided. However, the disclosure is not limited thereto, and for example, a dial, a first gear that rotates according to a rotation operation on the dial, and a second gear that meshes with the first gear may be provided. In this case, one of the first gear and the second gear meshes with the first rotary table 6A, the other gear meshes with the second rotary table 6B, and thus the rotary tables 6A and 6B can be rotated in opposite directions in conjunction with each other in response to the rotation operation on the dial.

In the above-described embodiment, the operation lever 7 is operable from the rear surface 42 by removing the first rear surface portion 422 from the housing 4. However, the disclosure is not limited thereto, and the operation lever 7 may be operable from the rear surface 42 by removing the second rear surface portion 423 from the housing 4.

A direction in which the operation lever 7 is operable is not limited to the rear surface 42 side, and may be the front surface 41 side or the top surface 45 side, or may be another direction.

In the above-described embodiment, the partition wall 4511 that partitions the space in the housing 4 into the first space SP1 and the second space SP2 is provided. However, the disclosure is not limited thereto, and the partition wall 4511 may be omitted. Alternatively, the partition wall 4511 may be provided at a component other than the top plate 451. Further, the top plate 451 may not be provided, and the top surface 45 may not cover the first space SP1 and the second space SP2 in the +Y direction.

In the above-described embodiment, the housing 4 includes the guide wall 411 that guides air inside the first space SP1 to the first discharge port 452. However, the disclosure is not limited thereto, and the guide wall 411 may be omitted. Alternatively, the guide wall may not be provided at the front surface 41, and may be disposed inside the housing 4.

In the above-described embodiment, the housing 4 is configured such that the first rotary table 6A on which the first projector 2A is placed and the second rotary table 6B on which the second projector 2B is placed are removable from the top surface 45 side. However, the housing 4 is not limited thereto and may be configured such that the projectors 2A and 2B and the rotary tables 6A and 6B are removable in another direction. For example, the housing 4 may be configured such that the projectors 2A and 2B and the rotary tables 6A and 6B are removable from the rear surface 42 side.

In the above-described embodiment, the first introduction port 431 and the first discharge port 452 are provided for the first space SP1, and the second introduction port 424 and the second discharge port 441 are provided for the second space SP2. However, the disclosure is not limited thereto, and the number and disposition of introduction ports for introducing air outside the housing 4 into the housing 4 can be appropriately changed, and the number and disposition of discharge ports for discharging air inside the housing 4 to the outside of the housing 4 can be appropriately changed. For example, when the housing 4 is provided with one introduction port, air introduced from the introduction port may be divided into the first space SP1 and the second space SP2. For example, when the housing 4 is provided with one discharge port, air inside the first space SP1 and air inside the second space SP2 may be merged and discharged to the outside of the housing 4 through the discharge port.

In the above-described embodiment, the projector 2 includes the three light modulators 273B, 273G, and 273R. However, the disclosure is not limited thereto and is also applicable to a projector including two or less or four or more light modulators 273.

In the above-described embodiment, the image projection apparatus 22 includes a substantially L-shaped optical path as shown in FIG. 2. However, the image projection apparatus 22 is not limited thereto and may include, for example, a substantially U-shaped optical path.

In the above-described embodiment, the light modulator 273 is implemented by a transmissive liquid crystal panel having a light incident surface and a light emitting surface different from each other. Alternatively, the light modulator 273 may be implemented by a reflective liquid crystal panel whose light incident surface is the same as a light emitting surface. As long as the light modulator 273 is a light modulator that can modulate an incident light flux to form an image according to image information, a light modulator other than a liquid crystal light modulator may be adopted, such as a device using a micromirror, for example, a digital micromirror device (DMD).

Summary of Disclosure

Hereinafter, a summary of the disclosure will be appended.

APPENDIX 1

A position adjustment apparatus including:

a housing including a first space in which a first projector is disposed and a second space in which a second projector is disposed;

a first rotary table on which the first projector is placed and which is rotatably supported by the housing about a first rotation axis; and a second rotary table on which the second projector is placed and which is rotatably supported by the housing about a second rotation axis parallel to the first rotation axis, in which the housing includes:

a first opening through which first image light projected from the first projector passes; and a second opening through which second image light projected from the second projector passes, a rotation direction of the first rotary table and a rotation direction of the second rotary table are opposite to each other, rotation of the first rotary table and rotation of the second rotary table are in conjunction with each other, and the first rotary table and the second rotary table are configured to be replaceable with respect to the housing.

According to such a configuration, since the first rotary table on which the first projector is placed and the second rotary table on which the second projector is placed rotate in opposite directions in conjunction with each other, it is not necessary to individually adjust a projection position of image light projected from each projector. Accordingly, since a display position of an image that is projected from each projector and displayed on a projection surface can be easily adjusted, an operation of adjusting the display position can be simplified.

By replacing the first rotary table and the second rotary table, it is possible to dispose projectors of different models as the first projector and the second projector in the position adjustment apparatus.

APPENDIX 2

The position adjustment apparatus according to Appendix 1, further including:

a first fixing tool and a second fixing tool configured to fix the first projector to the first rotary table, in which the first rotary table includes:

a first fixing portion to which the first projector is fixed by the first fixing tool; and a second fixing portion to which the first projector is fixed by the second fixing tool, and the first fixing portion and the second fixing portion are disposed at positions where an optical axis of a projection optical apparatus that projects the first image light overlaps the first rotation axis in the first projector when the first rotary table to which the first projector is fixed is viewed along the first rotation axis.

According to such a configuration, when the first rotary table and the second rotary table are rotated by the same angle, a movement amount of a projection position of the first image light on the projection surface can be easily matched with a movement amount of a projection position of the second image light on the projection surface. Accordingly, the size of the image formed by each of the first image light and the second image light on the projection surface can be easily adjusted.

APPENDIX 3

The position adjustment apparatus according to Appendix 1, further including:

a first fixing tool and a second: fixing tool configured to fix the first projector to the first rotary table, in which the first rotary table includes:

a first fixing portion to which the first projector is fixed by the first fixing tool; and a second fixing portion to which the first projector is fixed by the second fixing tool, and the first fixing portion and the second fixing portion are disposed at positions where the first rotation axis overlaps a light combiner configured to combine light emitted from a plurality of light modulators in the first projector when the first rotary table to which the first projector is fixed is viewed along the first rotation axis.

According to such a configuration, when the first rotary table and the second rotary table are rotated by the same angle, the movement amount of the projection position of the first image light on the projection surface can substantially match the movement amount of the projection position of the second image light on the projection surface. Accordingly, the size of the image formed by each of the first image light and the second image light on the projection surface can be easily adjusted.

APPENDIX 4

The position adjustment apparatus according to any one of Appendix 1 to Appendix 3, in which the housing is configured such that the first projector and the first rotary table, and the second projector and the second rotary table are removable from a top surface side of the housing.

According to such a configuration, the first rotary table on which the first projector is disposed and the second rotary table on which the second projector is disposed can be easily attached to and detached from the housing. Accordingly, a replacement operation of the projectors and the rotary tables can be easily performed.

APPENDIX 5

The position adjustment apparatus according to any one of Appendix 1 to Appendix 4, further including:

a first fixing member configured to fix the first rotary table in the rotation direction of the first rotary table and a direction along the first rotation axis; and a second fixing member configured to fix the second rotary table in the rotation direction of the second rotary table and a direction along the second rotation axis.

According to such a configuration, since the first rotary table and the second rotary table after position adjustment can be fixed, positions of the projectors can be fixed, and thus a projection position of an image on the projection surface can be fixed.

APPENDIX 6

The position adjustment apparatus according to any one of Appendix 1 to Appendix 5, in which the housing includes a partition wall configured to partition the first space and the second space.

According to such a configuration, it is possible to prevent heat of the projector disposed in one of the first space and the second space from influencing the projector disposed in the other space.

APPENDIX 7

The position adjustment apparatus according to any one of Appendix 1 to Appendix 6, in which the housing includes:

a first introduction port configured to establish communication between the first space and outside of the housing and introduce air outside the housing into the first space;

a first discharge port configured to establish communication between the first space and the outside of the housing and discharge air inside the first space to the outside of the housing;

a second introduction port configured to establish communication between the second space and the outside of the housing and introduce the air outside the housing into the second space; and a second discharge port configured to establish communication between the second space and the outside of the housing and discharge air inside the second space to the outside of the housing.

According to such a configuration, a flow system of air flowing in the first space in which the first projector is disposed and a flow system of air flowing in the second space in which the second projector is disposed can be independent of each other. Therefore, it is possible to prevent heat of air flowing in one of the first space and the second space from influencing air flowing in the other space. Accordingly, the projectors can be efficiently cooled.

APPENDIX 8

The position adjustment apparatus according to Appendix 7, in which the first discharge port is provided at a position on a second space side at a top surface of the housing, and the housing includes a guide wall that is disposed between the first opening and the second opening and configured to guide the air inside the first space to the first discharge port.

According to such a configuration, for example, even when discharged air from the first projector is directed toward the second space side, the discharged air can be guided to the first discharge port by the guide wall. Accordingly, it is possible to prevent the discharged air of the first projector from flowing into the second space and influencing the second projector disposed in the second space.

APPENDIX 9

The position adjustment apparatus according to any one of Appendix 1 to Appendix 8, in which each of the first opening and the second opening is a partial area in one opening.

According to such a configuration, since it is not necessary to provide any member for partitioning the first opening and the second opening, the configuration of the housing and the configuration of the position adjustment apparatus can be simplified.

APPENDIX 10

A projection system including:

a first projector configured to project first image light;

a second projector configured to project second image light; and the position adjustment apparatus according to any one of Appendix 1 to Appendix 9.

According to such a configuration, it is possible to obtain the same effects as those of the above-described position adjustment apparatus, and to implement a projection system that can easily adjust a size of a display screen.

What is claimed is:

1. A position adjustment apparatus comprising:

a housing including a first space in which a first projector is disposed and a second space in which a second projector is disposed;

a first rotary table on which the first projector is placed and which is rotatably supported by the housing about a first rotation axis, the first rotary table including a first arc-shaped guide groove; and a second rotary table on which the second projector is placed and which is rotatably supported by the housing about a second rotation axis parallel to the first rotation axis, the second rotary table including a second arc-shaped guide groove, wherein the housing includes a first opening through which first image light projected from the first projector passes, and a second opening through which second image light projected from the second projector passes, a rotation direction of the first rotary table and a rotation direction of the second rotary table are opposite to each other, rotation of the first rotary table and rotation of the second rotary table are in conjunction with each other, and the first rotary table is detachably secured to the housing by a first fastener inserted through the first arc-shaped guide groove, and the second rotary table is detachably secured to the housing by a second fastener inserted through the second arc-shaped guide groove, such that the first rotary table and the second rotary table are configured to be replaceable with respect to the housing.

2. The position adjustment apparatus according to claim 1, further comprising:

a first fixing tool and a second fixing tool configured to fix the first projector to the first rotary table, wherein the first rotary table includes a first fixing portion to which the first projector is fixed by the first fixing tool, and a second fixing portion to which the first projector is fixed by the second fixing tool, and the first fixing portion and the second fixing portion are disposed at positions where an optical axis of a projection optical apparatus that projects the first image light overlaps the first rotation axis in the first projector when the first rotary table to which the first projector is fixed is viewed along the first rotation axis.

3. The position adjustment apparatus according to claim 1, further comprising:

a first fixing tool and a second fixing tool configured to fix the first projector to the first rotary table, wherein the first rotary table includes a first fixing portion to which the first projector is fixed by the first fixing tool, and a second fixing portion to which the first projector is fixed by the second fixing tool, and the first fixing portion and the second fixing portion are disposed at positions where the first rotation axis overlaps a light combiner configured to combine light emitted from a plurality of light modulators in the first projector when the first rotary table to which the first projector is fixed is viewed along the first rotation axis.

4. The position adjustment apparatus according to claim 1, wherein the housing is configured such that the first projector and the first rotary table, and the second projector and the second rotary table are removable from a top surface side of the housing.

5. The position adjustment apparatus according to claim 1, further comprising:

a first fixing member configured to fix the first rotary table in the rotation direction of the first rotary table and a direction along the first rotation axis; and a second fixing member configured to fix the second rotary table in the rotation direction of the second rotary table and a direction along the second rotation axis.

6. The position adjustment apparatus according to claim 1, wherein the housing includes a partition wall configured to partition the first space and the second space.

7. The position adjustment apparatus according to claim 1, wherein the housing includes:

a first introduction port configured to establish communication between the first space and outside of the housing and introduce air outside the housing into the first space;

a first discharge port configured to establish communication between the first space and the outside of the housing and discharge air inside the first space to the outside of the housing;

a second introduction port configured to establish communication between the second space and the outside of the housing and introduce the air outside the housing into the second space; and a second discharge port configured to establish communication between the second space and the outside of the housing and discharge air inside the second space to the outside of the housing.

8. The position adjustment apparatus according to claim 7, wherein the first discharge port is provided at a region in a top surface of the housing, the region corresponding to the first space, the first discharge port is disposed at a position on a second space side at the region, and the housing includes a guide wall that is disposed between the first opening and the second opening and configured to guide the air inside the first space to the first discharge port.

9. The position adjustment apparatus according to claim 1, wherein each of the first opening and the second opening is a partial area in single opening.

10. A projection system comprising:

a first projector configured to project first image light;

a second projector configured to project second image light; and the position adjustment apparatus according to claim 1.

11. The position adjustment apparatus according to claim 1, wherein:

the first rotary table includes a plurality of the first arc-shaped guide grooves formed along a concentric circle centered on the first rotation axis, and the second rotary table includes a plurality of the second arc-shaped guide grooves formed along a concentric circle centered on the second rotation axis.

12. The position adjustment apparatus according to claim 1, wherein:

the first fastener and the second fastener are two-stage screws.

* * * * *